US008131067B2

(12) United States Patent
Lukac

(10) Patent No.: US 8,131,067 B2
(45) Date of Patent: Mar. 6, 2012

(54) IMAGE PROCESSING APPARATUS, IMAGE PROCESSING METHOD, AND COMPUTER-READABLE MEDIA FOR ATTAINING IMAGE PROCESSING

(75) Inventor: Rastislav Lukac, North York (CA)

(73) Assignee: Seiko Epson Corporation, Tokyo (JP)

( * ) Notice: Subject to any disclaimer, the term of this patent is extended or adjusted under 35 U.S.C. 154(b) by 717 days.

(21) Appl. No.: 12/337,338

(22) Filed: Dec. 17, 2008

(65) Prior Publication Data

US 2010/0061625 A1 Mar. 11, 2010

Related U.S. Application Data

(60) Provisional application No. 61/091,969, filed on Sep. 11, 2008.

(51) Int. Cl.
*G06K 9/00* (2006.01)
*H04N 5/228* (2006.01)

(52) U.S. Cl. ...................... 382/162; 348/222.1
(58) Field of Classification Search .................. None
See application file for complete search history.

(56) References Cited

U.S. PATENT DOCUMENTS

| 5,347,599 A | 9/1994 | Yamashita et al. |
| 6,075,889 A | 6/2000 | Hamilton, Jr. et al. |
| 6,181,376 B1 | 1/2001 | Rashkovskiy et al. |
| 6,377,711 B1 | 4/2002 | Morgana |
| 6,507,364 B1 * | 1/2003 | Bishay et al. ................ 348/242 |
| 6,628,330 B1 | 9/2003 | Lin |
| 6,714,242 B1 | 3/2004 | Kobayashi |
| 7,081,919 B2 | 7/2006 | Jaspers |
| 7,126,643 B2 * | 10/2006 | Song et al. .................... 348/448 |
| 7,212,689 B2 | 5/2007 | Muresan et al. |
| 7,982,798 B2 * | 7/2011 | Adams .......................... 348/448 |
| 8,004,588 B2 * | 8/2011 | Lukac .......................... 348/252 |
| 2003/0052981 A1 | 3/2003 | Kakarala et al. |

(Continued)

FOREIGN PATENT DOCUMENTS

JP 04006982 1/1992

(Continued)

OTHER PUBLICATIONS

An Edge-preserving Image Interpolation System for a Digital Camcorder, Kwan Pyo Hong, Joon Ki Paik, Hyo Ju Kim, and Chul Ho Lee, Department of Electronic Engineering, Chung-Ang University, Seoul, Korea, Micro Devices Business, Semiconductor Division, Samsung Electronics, Kyunggi-Do, Korea, Consumer Electronics, IEEE, Aug. 1996, vol. 42, Issue 3, (pp. 279-284).

*Primary Examiner* — Yuzhen Ge
(74) *Attorney, Agent, or Firm* — Mark P. Watson

(57) ABSTRACT

An image processing apparatus that receives mosaic image data having settings of only one color component, R, G, or B, in each pixel and subjects the received mosaic image data to a series of image processing to generate color image data with settings of all the three color components, R, G, and B, in each pixel; wherein the mosaic image data has the form of a Bayer color filter array; and the image processing apparatus includes: a vertical-direction color difference component computation module; a horizontal-direction color difference component computation module; an edge direction determination module; a color component interpolation module; an oblique edge pixel detection module; an oblique edge direction determination module; and an oblique edge pixel interpolation correction module.

16 Claims, 28 Drawing Sheets

U.S. PATENT DOCUMENTS

| | | | |
|---|---|---|---|
| 2003/0218621 A1* | 11/2003 | Jiang | 345/698 |
| 2004/0085458 A1 | 5/2004 | Yanof et al. | |
| 2005/0146629 A1 | 7/2005 | Muresan | |
| 2006/0170798 A1 | 8/2006 | Lee et al. | |
| 2006/0176375 A1 | 8/2006 | Hwang et al. | |
| 2006/0250655 A1* | 11/2006 | Wu | 358/3.27 |
| 2007/0242081 A1* | 10/2007 | Jeong et al. | 345/606 |
| 2008/0043115 A1* | 2/2008 | Tsukioka | 348/222.1 |
| 2009/0115870 A1* | 5/2009 | Sasaki | 348/223.1 |

FOREIGN PATENT DOCUMENTS

| | | |
|---|---|---|
| JP | 2000078597 | 3/2000 |

* cited by examiner

{ G-Component Pixel $$CDv(r,s) = z(r,s) - ( z(r-1,s) + z(r+1,s) ) / 2$$

where $z(r,s)$ is G Component, and $( z(r-1,s) + z(r+1,s) ) / 2$ is R Component or B Component.

Non-G-Component Pixel $$CDv(r,s) = ( z(r-1,s) + z(r+1,s) ) / 2 - z(r,s)$$

where $( z(r-1,s) + z(r+1,s) ) / 2$ is G Component, and $z(r,s)$ is R Component or B Component.

*FIG. 5A*

{ G-Component Pixel $$CDh(r,s) = z(r,s) - ( z(r,s-1) + z(r,s+1) ) / 2$$

where $z(r,s)$ is G Component, and $( z(r,s-1) + z(r,s+1) ) / 2$ is R Component or B Component.

Non-G-Component Pixel $$CDh(r,s) = ( z(r,s-1) + z(r,s+1) ) / 2 - z(r,s)$$

where $( z(r,s-1) + z(r,s+1) ) / 2$ is G Component, and $z(r,s)$ is R Component or B Component.

*FIG. 5B*

$$\begin{cases} CDv(r,s) = (\ CDv(r\text{-}2,s) + CDv(r\text{-}1,s) \\ \qquad\qquad + 4 \cdot CDv(r,s) + CDv(r+1,s) + CDv(r+2,s)\ ) / 8 \\ CDh(r,s) = (\ CDh(r,s\text{-}2) + CDh(r,s\text{-}1) \\ \qquad\qquad + 4 \cdot CDh(r,s) + CDh(r,s+1) + CDh(r,s+2)\ ) / 8 \end{cases}$$

$$V_v = (CDv(r+1,s) - CDv(r,s))^2 + (CDv(r,s) - CDv(r-1,s))^2$$
$$+ (CDv(r+1,s+1) - CDv(r,s+1))^2 + (CDv(r,s+1) - CDv(r-1,s+1))^2$$
$$+ (CDv(r+1,s-1) - CDv(r,s-1))^2 + (CDv(r,s-1) - CDv(r-1,s-1))^2$$
FIG. 8A
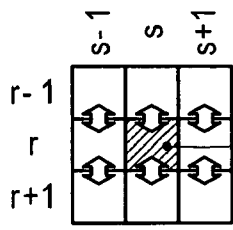
FIG. 8B
$$V_h = (CDh(r,s+1) - CDh(r,s))^2 + (CDh(r,s) - CDh(r,s-1))^2$$
$$+ (CDh(r+1,s+1) - CDh(r+1,s))^2 + (CDh(r+1,s) - CDv(r+1,s-1))^2$$
$$+ (CDh(r-1,s+1) - CDh(r-1,s))^2 + (CDh(r-1,s) - CDh(r-1,s-1))^2$$
FIG. 9A
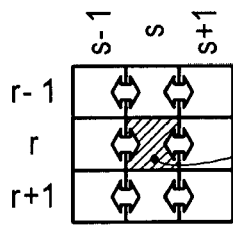
FIG. 9B
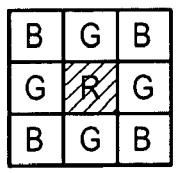
FIG. 10A
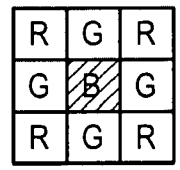
FIG. 10B
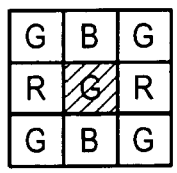
FIG. 10C
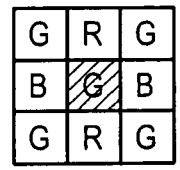
FIG. 10D $$Vv = 2 \cdot (CDv(r+1,s) - CDv(r,s))^2 + 2 \cdot (CDv(r,s) - CDv(r-1,s))^2$$
$$+ (CDv(r+1,s+1) - CDv(r,s+1))^2 + (CDv(r,s+1) - CDv(r-1,s+1))^2$$
$$+ (CDv(r+1,s-1) - CDv(r,s-1))^2 + (CDv(r,s-1) - CDv(r-1,s-1))^2$$

FIG. 11A $$Vh = 2 \cdot (CDh(r,s+1) - CDh(r,s))^2 + 2 \cdot (CDh(r,s) - CDh(r,s-1))^2$$
$$+ (CDh(r+1,s+1) - CDh(r+1,s))^2 + (CDh(r+1,s) - CDv(r+1,s-1))^2$$
$$+ (CDh(r-1,s+1) - CDh(r-1,s))^2 + (CDh(r-1,s) - CDh(r-1,s-1))^2$$

FIG. 11B $$Vh = (CDh(r,s+2) - CDh(r,s))^2 + (CDh(r,s) - CDh(r,s-2))^2$$
$$+ (CDh(r,s+2) - CDh(r,s-2))^2$$
$$+ (CDh(r+1,s+2) - CDh(r+1,s))^2 + (CDh(r+1,s) - CDv(r+1,s-2))^2$$
$$+ (CDh(r+1,s+2) - CDh(r+1,s-2))^2$$
$$+ (CDh(r-1,s+2) - CDh(r-1,s))^2 + (CDh(r-1,s) - CDh(r-1,s-2))^2$$
$$+ (CDh(r-1,s+2) - CDh(r-1,s-2))^2$$

FIG. 12A

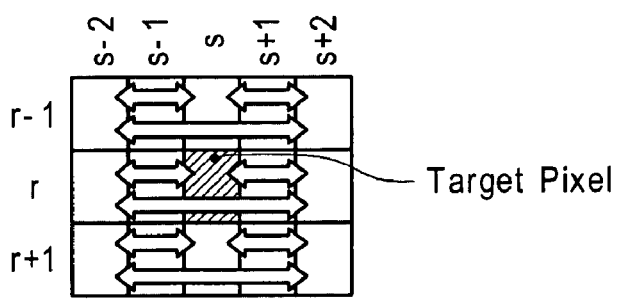

FIG. 12B $$\left.\begin{array}{l}\left|CDc(r,s)-(CDc(r-1,s)+CDc(r+1,s))/2\right|>\sigma\\ \text{and}\\ \left|CDc(r,s)-(CDc(r,s-1)+CDc(r,s+1))/2\right|>\sigma\end{array}\right\}\Rightarrow\alpha(r,s)=1$$
FIG. 19A
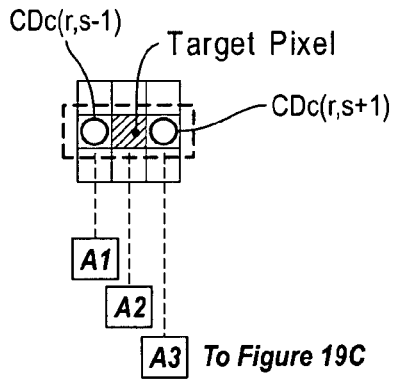
FIG. 19B
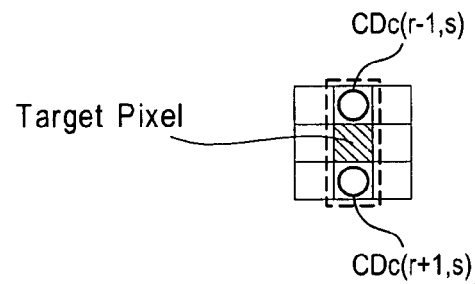
FIG. 19D
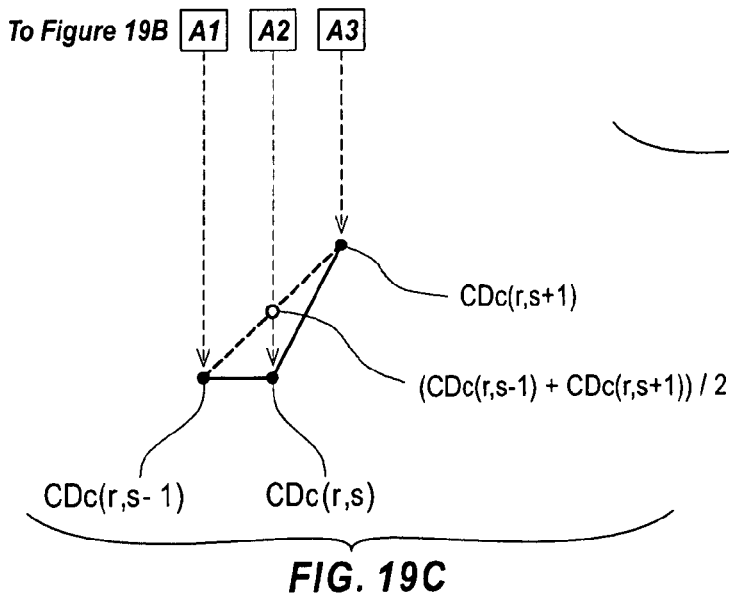
FIG. 19C

$$V45 = \{ (\ CDv(r+2,s-2) + CDh(r+2,s-2)\ ) - (\ CDv(r,s) + CDh(r,s)\ ) \}^2$$
$$+ \{ (\ CDv(r,s) + CDh(r,s)\ ) - (\ CDv(r-2,s+2) + CDh(r-2,s+2)\ ) \}^2$$
FIG. 22A
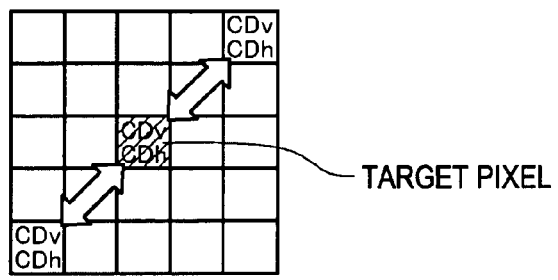
FIG. 22B
$$V135 = \{ (\ CDv(r-2,s-2) + CDh(r-2,s-2)\ ) - (\ CDv(r,s) + CDh(r,s)\ ) \}^2$$
$$+ \{ (\ CDv(r,s) + CDh(r,s)\ ) - (\ CDv(r+2,s+2) + CDh(r+2,s+2)\ ) \}^2$$
FIG. 23A
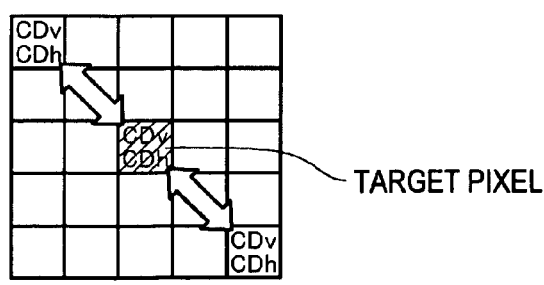
FIG. 23B
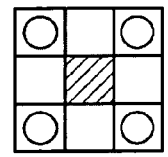
FIG. 24

$$B(r,s) = (\ B(r-1,s-1) + B(r+1,s+1)\ )/2$$

$$G(r,s) = (\ CDv(r-1,s-1)$$
$$+ CDh(r-1,s-1)$$
$$+ CDv(r+1,s+1)$$
$$+ CDh(r+1,s+1)\ )/4 + B(r,s)$$

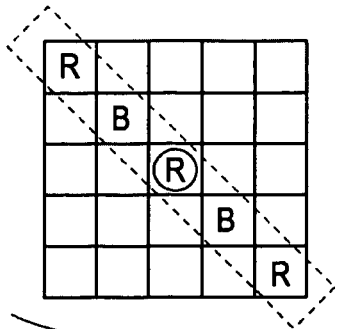
$$B(r,s) = \{\ 2B(r-1,s-1) + 2B(r+1,s+1)$$
$$- R(r-2,s-2) + 2R(r,s) - R(r+2,s+2)\ \}/4$$
FIG. 29A
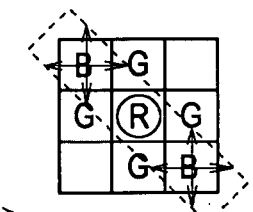
$$G'(r,s) = (\ CDv(r-1,s-1)$$
$$+ CDh(r-1,s-1)$$
$$+ CDv(r+1,s+1)$$
$$+ CDh(r+1,s+1)\ )/4 + B(r,s)$$
FIG. 29B
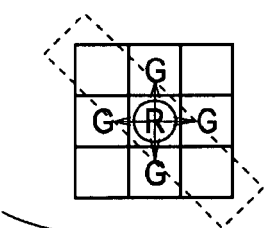
$$G''(r,s) = (\ CDv(r,s)$$
$$+ CDh(r,s)\ )/2 + z(r,s)$$
FIG. 29C
$$G(r,s) = (\ G'(r,s) + G''(r,s)\ )/2$$
FIG. 29D

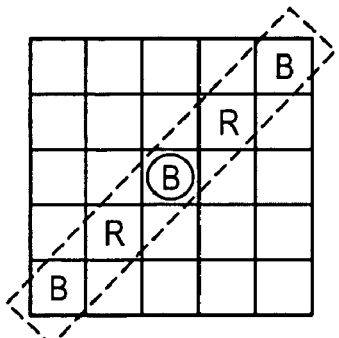
$R(r,s) = \{ 2R(r-1,s+1) + 2R(r+1,s-1)$
$\qquad - B(r-2,s+2) + 2B(r,s) - B(r+2,s-2) \} / 4$
FIG. 30A
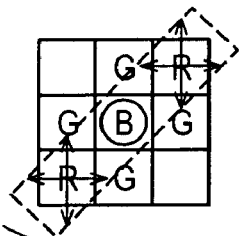
$G'(r,s) = ( CDv(r-1,s+1)$
$\qquad + CDh(r-1,s+1)$
$\qquad + CDv(r+1,s-1)$
$\qquad + CDh(r+1,s-1) ) / 4 + R(r,s)\cdot$
FIG. 30B
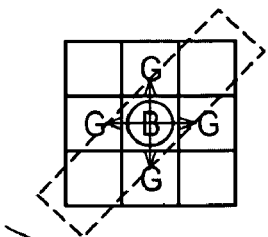
$G''(r,s) = ( CDv(r,s)$
$\qquad + CDh(r,s) ) / 2 + z(r,s)$
FIG. 30C
$G(r,s) = ( G'(r,s) + G''(r,s) ) / 2$
FIG. 30D

$CDGR = (\ CDv(r-1, s-1)$
$\qquad + 2CDh(r,s)$
$\qquad + CDv(r+1, s+1)\ )/4$ $R(r,s) = G(r,s) - CDGR$ $CDGB = (\ CDh(r-1, s-1)$
$\qquad + 2CDv(r,s)$
$\qquad + CDh(r+1, s+1)\ )/4$ $B(r,s) = G(r,s) - CDGB$

IMAGE PROCESSING APPARATUS, IMAGE PROCESSING METHOD, AND COMPUTER-READABLE MEDIA FOR ATTAINING IMAGE PROCESSING

CROSS-REFERENCE TO A RELATED APPLICATION

This application claims the benefit of U.S. Provisional Application No. 61/091,969, filed Sep. 11, 2008, which application is incorporated herein by reference in its entirety.

THE FIELD OF THE INVENTION

Embodiments of the present invention relate generally to techniques for generating image data with an imaging device, such as a digital camera. More specifically, embodiments of the invention pertain to techniques of generating color image data by application of a color filter array having a mosaic arrangement of fine color filters of R (red), G (green), and B (blue) corresponding to three primary colors of light.

BACKGROUND

With the advancement of digital techniques, images are increasingly processed as digital data (image data). Imaging devices such as digital cameras enable immediate output of captured images in the form of image data. Imaging devices are typically equipped with an electronic image sensor consisting of small elements for converting light intensities into electric signals. The imaging device focuses a captured image of a subject on the image sensor by means of an optical system and detects the light intensities in the individual elements as electric signals to generate image data. The light entering the optical system may be divided into three color components, R, G, and B corresponding to three primary colors of light. The respective color lights of the three color components R, G, and B are directed to the image sensor, and the electric signals representing the light intensities of the respective color components acquired by the sensor are output to generate color image data. It is noted that G components are often referred to as "luminance" components whereas R and B components are often referred to as "chrominance" components.

The simplest method of acquiring the respective color lights of the three color components R, G, and B (which are obtained as divisions of the light entering the optical system) by the image sensor uses a spectroscopic prism to divide the incident light into the color lights of the three color components R, G, and B and focuses the respective color lights on image sensors to generate image data with regard to the respective color components R, G, and B. This method undesirably requires the three image sensors. Therefore, an imaging device relying on three image sensors to capture color images is sometimes called a "three image sensor" device. To reduce the cost of an imaging device, one common technique uses a color filter array to allocate one of the R, G, and B color components to each of the light-sensitive elements constituting the image sensor in order to attain detection of the respective color components R, G, and B by a single image sensor. A typical configuration of this technique provides small color filters allowing transmission of only the R component in front of the photo-elements assigned for detection of the R component, small color filters allowing transmission of only the G component in front of the elements assigned for detection of the G component, and small color filters allowing transmission of only the B component in front of the elements assigned for detection of the B component. Since each element assigned for detection of a predetermined color component (for example, the R component) is unable to detect the other color components (for example, the G component and the B component), the resulting image data accordingly has a mosaic arrangement of pixels of the R component, pixels of the G component, and pixels of the B component in order to allow effective restoration of two color components in each pixel location. Interpolation of these two missing color components in each pixel with color components of adjacent pixels enables generation of color image data with the settings of all the color components R, G, and B in all the pixels.

The process of interpolating the missing color components in the image data of the mosaic arrangement to generate color image data with the settings of all the color components R, G, and B is sometimes referred to as "demosaicing process". An imaging device that uses only one image sensor covered by a color filter array is occasionally called a "single image sensor" device.

The single image sensor device requires the interpolation of the missing color components. This naturally consumes the time for interpolation and may cause the occurrence of aliasing colors due to interpolation error. There are diverse proposed techniques with a view to preventing the occurrence of aliasing colors while minimizing an increase of the time required for interpolation. One proposed technique computes color difference components (for example, differences between the G component and the R component) in the respective pixels after computation of the missing color components, removes the pixel with the maximum color difference component and the pixel with the minimum color difference component as noise from a pixel array of a preset number of pixels including a target pixel, and recalculates the respective color components in the target pixel (see JP-A-2005-167974). Another proposed technique applies low-pass filters to the color difference components computed in the respective pixels and recalculates the respective color components in the target pixel from the color difference components after removal of noise (see JP-A-2005-260908).

With the consumers' increasing demands for the higher picture quality of imaging devices, development of a demosaicing technique that prevents the occurrence of aliasing colors has been highly demanded. The number of pixels constituting each image captured by the imaging device is increasing to fulfill the consumers' demands for the higher picture quality. Development of a demosaicing technique that enables the high-speed processing thus has also been demanded.

SUMMARY OF SOME EXAMPLE EMBODIMENTS

An advantage of some example embodiments of the invention is that they provide a demosaicing technique that enables high-speed processing while effectively preventing the occurrence of aliasing colors.

In one example embodiment of the invention, an image processing apparatus is configured to receive mosaic image data having settings of only one color component, R, G, or B, in each pixel and to subject the received mosaic image data to a series of image processing to generate color image data with settings of all the three color components R, G, and B in each pixel. In this example embodiment, the mosaic image data has the form of a Bayer color filter array. The image processing apparatus includes various modules. A vertical-direction color difference component computation module is configured to obtain the G component in the pixel location of another color component or to obtain another color component in the G component pixel location using vertically neighboring available components in order to compute a vertical-direction color difference component between the G component and the another color component in each pixel included in each of the pixel columns of the mosaic image. A horizontal-direction color difference component computation module is configured to obtain the G component in the pixel location of another color component or to obtain another color component in the G component pixel location using horizontally neighboring color components in order to compute a horizontal-direction color difference component between the G component and the another color component in each pixel included in each of the pixel rows of the mosaic image. An edge direction determination module is configured to determine an edge direction in each pixel as any one of the vertical direction or the horizontal direction by selecting a pixel of the R component and a pixel of the B component from among the mosaic image data, and comparing a variation of the vertical color difference component and a variation of the horizontal color difference component in each of the selected pixels. A color component interpolation module is configured to interpolate a missing color component, which is a color component not set in the pixel for each pixel of the mosaic image data, on the basis of the color component set in the mosaic image data while referencing the edge direction. An oblique edge pixel detection module is configured to detect an oblique edge pixel, of which the edge direction is oriented obliquely, by analyzing the full-color image data in which the missing color components, absent in the original raw image data, are interpolated. An oblique edge direction determination module is configured to determine an oblique edge direction, which is the edge direction in the oblique edge pixel, on the basis of the vertical-direction color difference component and the horizontal-direction color difference component. An oblique edge pixel interpolation correction module is configured to recalculate the two interpolated color components in the oblique edge pixel on the basis of at least one of the mosaic image data, the vertical-direction color difference component and the horizontal-direction color difference component in a pixel placed in the oblique edge direction from the oblique edge pixel and then update the color component under consideration obtained by the color component interpolation module with the calculated color component to thereby correct the interpolated result in the oblique edge pixel.

In another example embodiment of the invention, an image processing method corresponds to the example image processing apparatus described above.

In another example embodiment of the invention, one or more computer-readable media have computer-readable instructions thereon which, when executed, implement the image processing method described above.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5A and FIG. 5B show calculation formulae for calculating color difference components from raw image data.

FIG. 8A and FIG. 8B show calculation of a variation amount Vv in a vertical direction from color difference components CDv in the vertical direction.

FIG. 9A and FIG. 9B show calculation of a variation amount Vh in a horizontal direction from color difference components CDh in the horizontal direction.

FIG. 10A to FIG. 10D show possible arrangements of adjacent pixels around a target pixel selected for determination of an edge direction.

FIG. 11A and FIG. 11B show one method applicable to determination of edge directions in G pixels.

FIG. 12A and FIG. 12B are diagrams showing an example of another method for computing the variation of a color difference component.

FIG. 19A to FIG. 19D are diagrams showing the method for detecting an oblique edge pixel.

FIG. 22A and FIG. 22B show calculation of the variation V45 of the color difference component in the right upward direction.

FIG. 23A and FIG. 23B show calculation of the variation V135 of the color difference component in the right downward direction.

FIG. 24 shows the method for removing oblique edge noise.

FIG. 29A to FIG. 29D show an advanced process of reinterpolating an interpolated chrominance component and an interpolated luminance component in an R pixel along the right downward direction.

FIG. 30A to FIG. 30D show an advanced process of reinterpolating an interpolated chrominance component and an interpolated luminance component in a B pixel along the right upward direction.

DETAILED DESCRIPTION OF SOME EXAMPLE EMBODIMENTS

Figure 1:
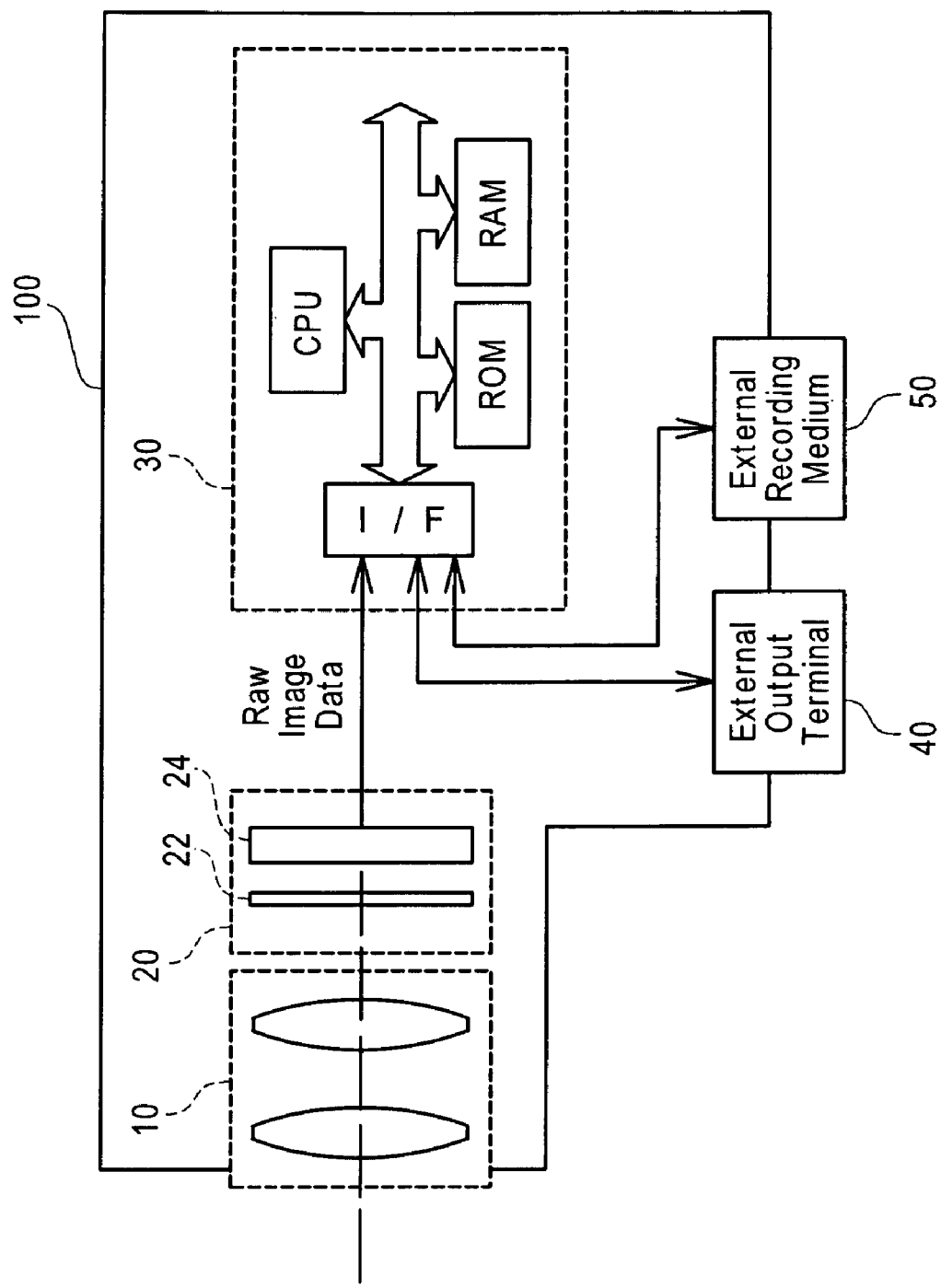
FIG. 1 schematically illustrates the configuration of a digital camera equipped with an image processing apparatus in one embodiment of the invention.

The invention may be understood more fully with reference to an example embodiment described below in the following sequence based on the accompanied drawings.
A. System Configuration
B. Outline of Color Image Data Generation Process
C. Edge Direction Map Creation Process
D. G Component Interpolation Process
E. Non-G Pixel Interpolation Process
F. G Pixel Interpolation Process
G. Oblique Edge Portion Correction Process
  G-1. Detection of Oblique Edge Pixel
  G-2. Determination of Oblique Edge Direction
  G-3. Reinterpolation of Oblique Edge Portion In the following detailed description of the embodiments, reference is made to the accompanying drawings that show, by way of illustration, specific embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

A. System Configuration

FIG. 1 schematically illustrates the configuration of a digital camera 100 equipped with an image processing apparatus 30 in one embodiment of the invention. As illustrated, the digital camera 100 includes an optical system 10 that has a group of multiple lenses, an imaging assembly 20 that converts an image of a subject formed by the optical system 10 into electric signals, and the image processing apparatus 30 that receives the electric signals from the imaging assembly 20 and makes the received electric signals subjected to a predetermined series of image processing to generate color image data.

The imaging assembly 20 has an image sensor 24 with a two-dimensional arrangement of multiple fine imaging elements for converting the light intensities into electric signals. A color filter array 22 is provided before the image sensor 24 and has a mosaic arrangement of fine color filters of R (red), G (green), and B (blue). The arrangement of the R, G, and B color filters constituting the color filter array 22 will be described later in detail. The R color filters, the G color filters, and the B color filters are constructed to allow transmission of R color light, transmission of G color light, and transmission of B color light, respectively. The image sensor 24 captures image data having a mosaic arrangement of image parts responsive to the R light intensities, image parts responsive to the G light intensities, and image parts responsive to the B light intensities according to the mosaic arrangement of the R, G, and B color filters in the color filter array 22.

The image processing apparatus 30 mounted on the digital camera 100 receives the image data of the mosaic arrangement from the imaging assembly 20 and generates color image data with settings of the R component, the G component, and the B component in the respective pixels. In the image processing apparatus 30 of the embodiment, a CPU, a ROM, a RAM, and a data input/output interface (I/F) are interconnected via a bus to enable mutual data transmission. The CPU performs a series of processing to generate the color image data according to computer-readable instructions stored in the ROM or stored on other computer-readable media. The resulting color image data thus generated may be output to an external device via an external output terminal 40 or may be output to an external recording medium 50.

The image data with the mosaic arrangement of the R, G, and B components captured by the image sensor 24 is used as source data, which is referred to by the image processing apparatus 30 to generate the color image data with the settings of the R, G, and B components in the respective pixels. The image data of the mosaic arrangement captured by the image sensor 24 may thus be hereafter referred to as "raw image data".

Figure 2:
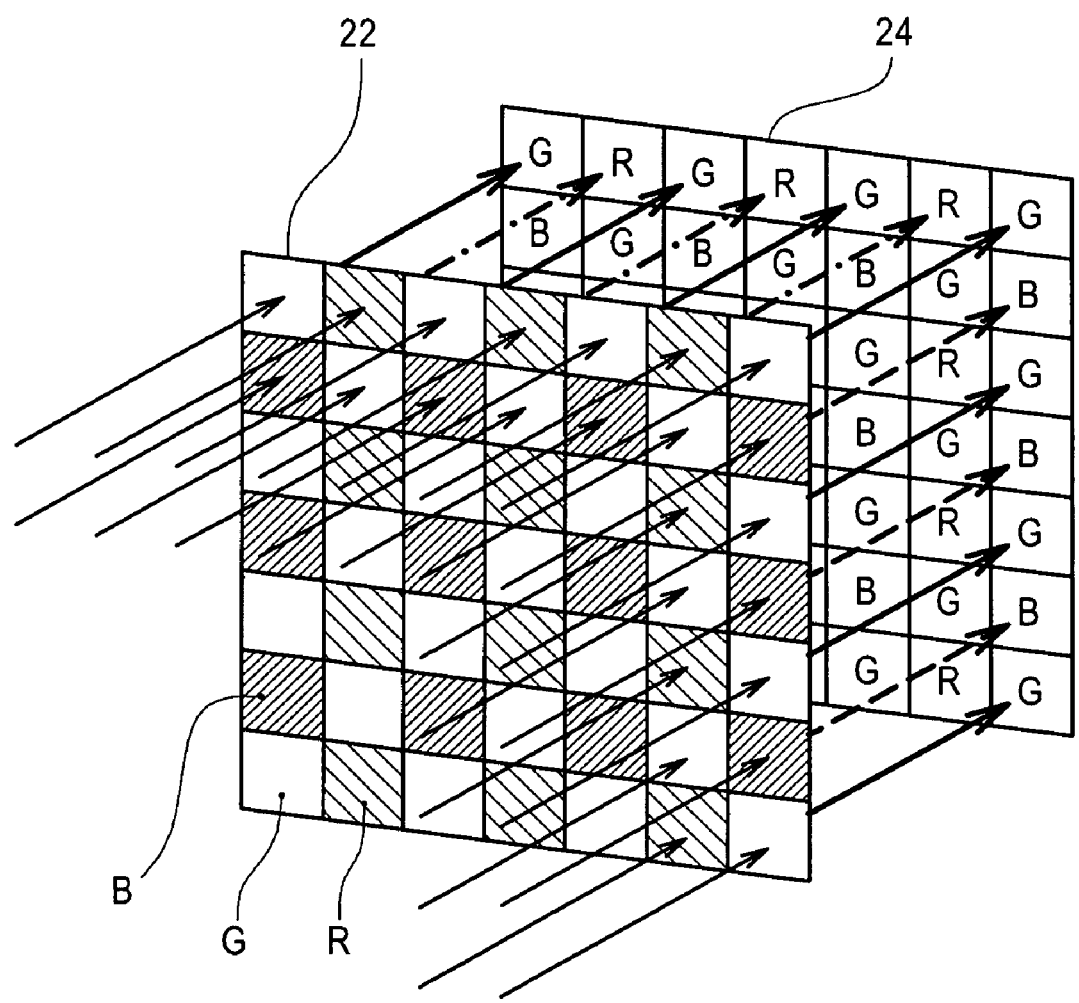
FIG. 2 is a conceptual view showing the structure of a color filter array and an image sensor included in an imaging assembly of FIG. 1.

FIG. 2 is a conceptual view showing the structure of the color filter array 22 and the image sensor 24. As mentioned above, the image sensor 24 has the two-dimensional arrangement of fine imaging elements that output electric signals corresponding to the light intensities. In the illustrated example of FIG. 2, the fine imaging elements are arranged in a lattice pattern. Each of small rectangles in the lattice pattern of the image sensor 24 conceptually represents one imaging element (or light-sensitive photo element).

The color filter array 22 has one of the R color filter, the G color filter, and the B color filter set corresponding to the position of each of the multiple imaging elements constituting the image sensor 24. In FIG. 2, the sparsely hatched rectangles, the densely hatched rectangles, and the non-hatched open rectangles respectively denote the R color filters, the B color filters, and the G color filters. In the arrangement of the R, G, and B color filters, the G color filters are positioned first to be diagonal to one another and form a checkerboard pattern. Namely the G color filters occupy half the area of the color filter array 22. The same numbers of the R color filters and the B color filters are then evenly arranged in the remaining half area of the color filter array 22. The resulting color filter array 22 of this arrangement shown in FIG. 2 is called the Bayer color filter array.

As mentioned above, the G color filters, the R color filters, and the B color filters are designed to allow transmission of only the G color light, transmission of only the R color light, and transmission of only the B color light, respectively. The image sensor 24 accordingly captures the image data of the mosaic arrangement by the function of the Bayer color filter array 22 located before the image sensor 24 as shown in FIG. 2. The image data of the mosaic arrangement is not processable in the same manner as ordinary image data and cannot directly express an image. The image processing apparatus 30 receives the image data of the mosaic arrangement (raw image data) and generates ordinary color image data having the settings of the R, G, and B components in the respective pixels.

B. Outline of Color Image Data Generation Process

Figure 3:
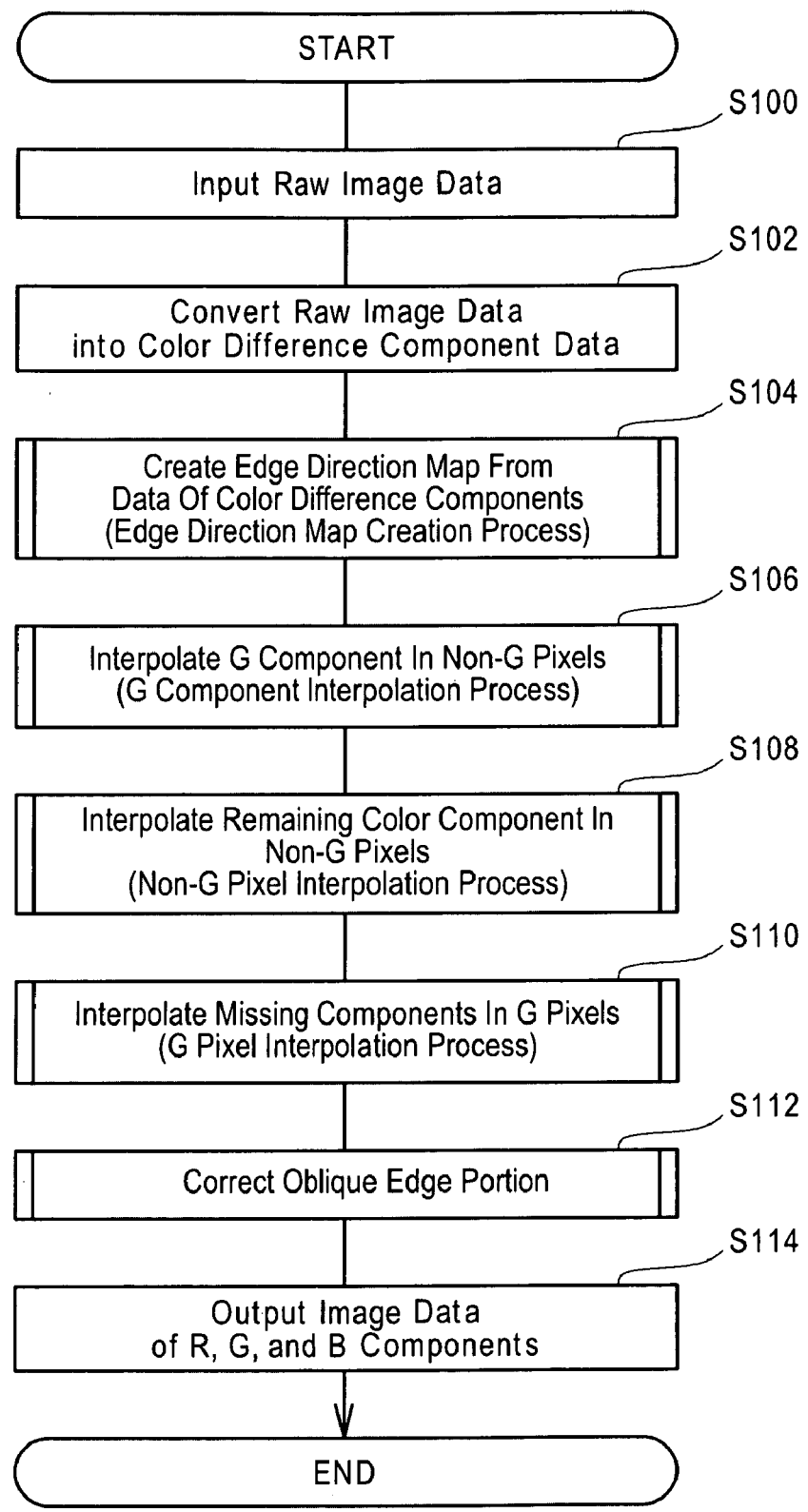
FIG. 3 is a flowchart showing a color image data generation process, which is executed by the image processing apparatus of the embodiment to generate color image data from raw image data.

FIG. 3 is a flowchart showing a color image data generation process, which is executed by the image processing apparatus 30 of the embodiment to generate color image data from the raw image data. In the structure of this embodiment, the CPU included in the image processing apparatus 30 executes this color image data generation by the software configuration. This is, however, not essential, but a specific hardware element, for example, a signal processor, may be used for the same purpose.

On the start of the color image data generation process, the CPU first receives raw image data as source data from the image sensor 24 (step S100) and converts the received raw image data into data of color difference components (step S102) as described below in detail.

Figure 4:
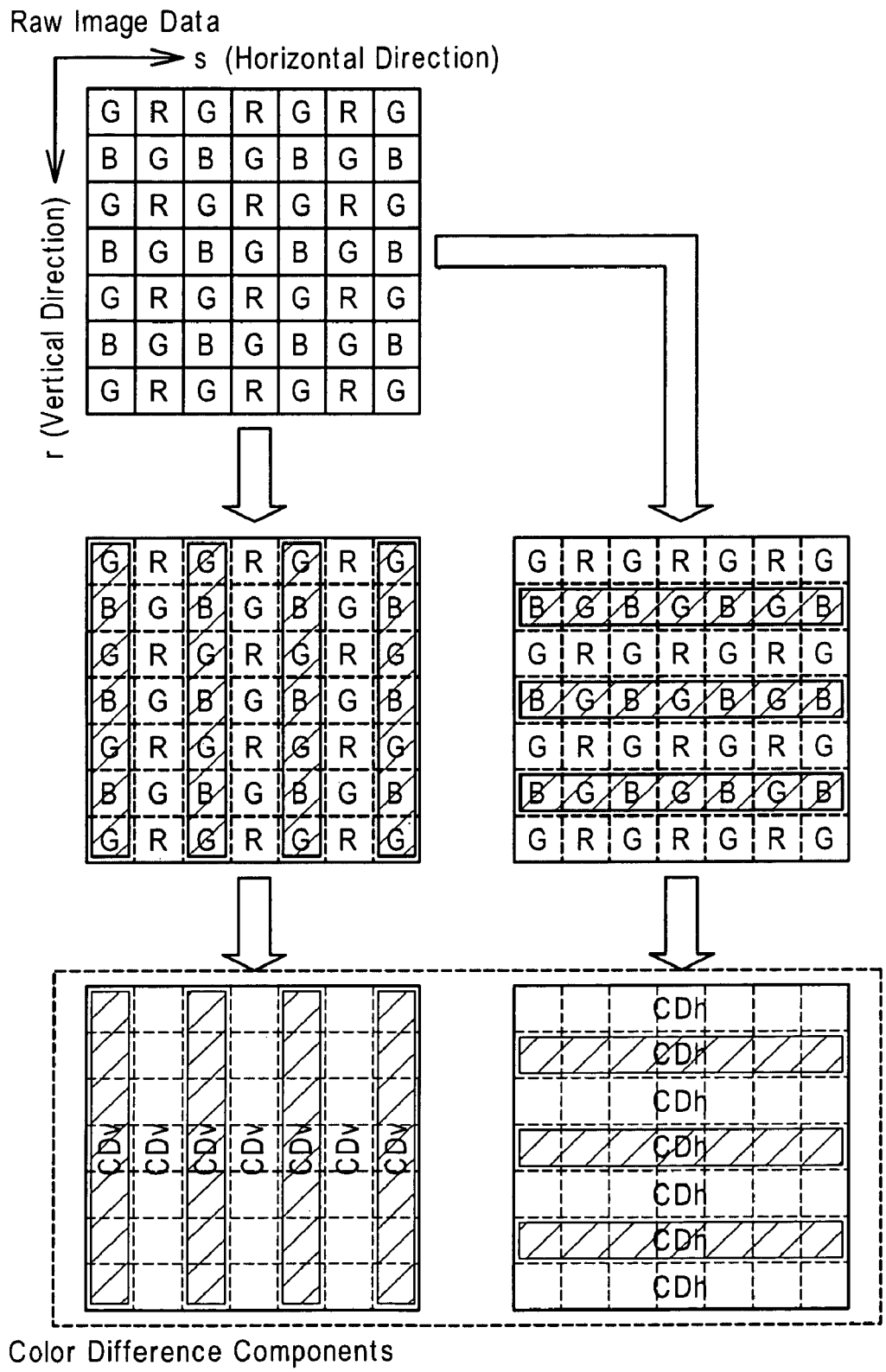
FIG. 4 conceptually shows a process of converting raw image data into data of color difference components.

FIG. 4 conceptually shows a process of converting raw image data into data of color difference components. The top of FIG. 4 shows a conceptual view of the raw image data read from the image sensor 24. The raw image data obtained with the Bayer color filter array has the mosaic arrangement of the R, G, and B components. In a horizontal direction, there are only two types of pixel rows in the raw image data: pixel rows having alternately arranged G pixels (pixels with G component) and R pixels (pixels with R component) and pixel rows having alternately arranged G pixels and B pixels (pixels with B component). In a vertical direction, there are similarly only two types of pixel columns in the raw image data: pixel columns having alternately arranged G pixels and R pixels and pixel columns having alternately arranged G pixels and B pixels. The middle of FIG. 4 conceptually shows that the raw image data consists of only the pixel rows of alternate G pixels and R pixels and the pixel rows of alternate G pixels and B pixels in the horizontal direction while consisting of only the pixel columns of alternate G pixels and R pixels and the pixel columns of alternate G pixels and B pixels.

Based on this result of observation, the color image data generation process of this embodiment converts the raw image data of the R, G, and B components into data representing differences of color components of the pixel rows in the horizontal direction (color difference components in the horizontal direction) and data representing differences of color components of the pixel columns in the vertical direction (color difference components in the vertical direction). For example, the raw image data is converted into data on color difference components between G and R components with regard to the pixel rows or the pixel columns of alternate G pixels and R pixels. Similarly the raw image data is converted into data on color difference components between G and B components with regard to the pixel rows or the pixel columns of alternate G pixels and B pixels. Calculation formulae for calculating the color difference components will be described in detail later.

The bottom of FIG. 4 conceptually shows the color difference components in the horizontal direction and in the vertical direction thus obtained. A left-side view on the bottom shows color difference components CDv in the vertical direction obtained by processing the raw image data in the vertical direction. Each of the hatched pixel columns corresponds to a pixel column of alternate G pixels and B pixels. Each color difference component CDv on this pixel column accordingly represents a color difference component between the G component and the B component. Each of the remaining non-hatched pixel columns corresponds to a pixel column of alternate G pixels and R pixels. Each color difference component CDv on this pixel column accordingly represents a color difference component between the G component and the R component. The raw image data in the horizontal direction is similarly processable. Each of hatched pixel rows gives color difference components CDh between the G pixels and the B pixels. Each of the remaining non-hatched pixel rows gives color difference components CDh between the G pixels and the R pixels.

FIG. 5A and FIG. 5B show calculation formulae for calculating the color difference components from the raw image data. FIG. 5A shows calculation formulae for calculating the color difference components CDv in the vertical direction, and FIG. 5B shows calculation formulae for calculating the color difference components CDh in the horizontal direction. In these calculation formulae, "z" denotes values of the raw image data obtained by the image sensor 24, and z(r,s) shows a value at a specific position defined by an r-th pixel position (i.e., r-th image row) downward from the position of the origin set in an image and an s-th pixel position (i.e., s-th image column) rightward from the position of the origin (see the top of FIG. 4).

Referring to FIG. 5A, the description regards the calculation formulae for calculating the color difference components CDv in the vertical direction. When a target pixel as an object of computation of the color difference component CDv is a pixel with the G component (G pixel), the upper calculation formula of FIG. 5A is adopted. The process first calculates an average of values of pixels directly above and below the target pixel (that is, a second term surrounded by the one-dot chain line) and subtracts the calculated average from the G component of the target pixel (that is, a first term surrounded by the broken line) to calculate a color difference component CDv of the target pixel in the vertical direction. Since the target pixel for computation of the color difference component CDv is the G pixel, the tone value z(r,s) of the target pixel naturally represents the G component. The element z(r−1,s) in the second term shows a tone value of the raw image data in the upper pixel above the target pixel, whereas the element z(r+1,s) in the second term shows a tone value of the raw image data in the pixel below the target pixel. As explained above with reference to FIG. 4, these two pixels above and below the target G pixel may be R pixels or B pixels but are always pixels of an identical color component. The second term surrounded by the one-dot chain line in the upper calculation formula in FIG. 5A accordingly represents either the R component or the B component calculated from the values of the pixels (that is, either the R pixels or the B pixels) neighboring the target pixel in the vertical direction. Application of the upper calculation formula in FIG. 5A determines the color difference component CDv in the vertical direction with regard to the pixel with the G component (G pixel), irrespective of the vertically neighboring pixels as the R pixels or the B pixels.

It should be noted that application of the identical calculation formula to the R pixels and the B pixels as the vertically neighboring pixels gives two different types of the color difference components CDv. When the pixels neighboring the target pixel in the vertical direction are the R pixels, the resulting color difference component CDv in the vertical direction represents the color difference component between the G component and the R component. When these two pixels are the B pixels, on the other hand, the resulting color difference component CDv in the vertical direction represents the color difference component between the G component and the B component.

The color difference components CDv in the vertical direction are similarly computable with regard to pixels other than the G pixels (that is, R pixels and B pixels). For example, when a target pixel as the object of computation of the color difference component CDv is an R pixel, pixels directly above and below the target pixel are G pixels as explained above with reference to FIG. 4. The average of the values of these two pixels is believed to specify the G component in the target pixel as the object of computation of the color difference component CDv. Subtraction of the tone value of the target pixel (in this case, the R component) from the specified G component determines the color difference component CDv. Each B pixel set as the target pixel is subjected to the same series of processing. With regard to the pixels other than the G pixels, as shown in the lower calculation formula of FIG. 5A, subtraction of a second term surrounded by the one-dot chain line from a first term surrounded by the broken line on the right side gives the color difference component CDv in the vertical direction.

The identical calculation formula is applicable to computation of the color difference components CDv in the vertical direction, with regard to both the R pixel and the B pixel set as the target pixel other than the G pixel. It should, however, be noted that the R pixel and the B pixel processed as the target pixel give two different types of the color difference components CDv. When the target pixel is the R pixel, the resulting color difference component CDv represents the color difference component between the G component and the R component. When the target pixel is the B pixel, on the other hand, the resulting color difference component CDv represents the color difference component between the G component and the B component.

The color image data generation process of the embodiment applies the completely identical calculation formulae for the advanced processing with the two different types of the color difference components CDv. Application of the identical calculation formulae desirably attains the simplicity and the high speed of the advanced processing with the two different types of the color difference components CDv, which are comparable to the conventional simple processing. Unlike the conventional simple processing, however, this advanced processing of the embodiment enables adequate demosaicing with prevention of the occurrence of aliasing colors.

The color difference components CDh in the horizontal direction are computable in the same manner as the color difference components CDv in the vertical direction explained above. The computation of the color difference components CDh is explained briefly with reference to FIG. 5B. As shown in the upper calculation formula of FIG. 5B, subtraction of a second term surrounded by the one-dot chain line from a first term surrounded by the broken line on the right side gives the color difference component CDh of the G pixel in the horizontal direction. In the calculation formula, the element z(r,s) represents a tone value (that is, the G component) of the raw image data in a target pixel as the object of computation of the color difference component. The element z(r,s−1) shows a tone value of the raw image data in a pixel on the left of the target pixel, whereas the element z(r,s+1) shows a tone value of the raw image data in a pixel on the right of the target pixel. These two pixels on the left and the right of the target G pixel may be R pixels or B pixels but are always pixels of an identical color component.

In computation of the color difference component CDh in the horizontal direction with regard to a target pixel other than the G pixel (that is, with regard to either an R target pixel or a B target pixel), the pixels on the left and the right of the R or B target pixel are the G pixels. As shown in the lower calculation formula of FIG. 5B, subtraction of a second term surrounded by the one-dot chain line (a tone value of the target pixel) from a first term surrounded by the broken line (an average of values of the left and the right pixels) gives the color difference component CDh in the horizontal direction.

The identical calculation formulae are applicable to computation of the color difference components CDh in the horizontal direction, with regard to the target G pixel having the R pixels or the B pixels as the left and the right pixels and with regard to both the R pixel and the B pixel set as the target pixel other than the G pixel. The computation, however, gives two different types of the color difference components CDh, that is, the color difference component between the G component and the R component and the color difference component between the G component and the B component. Application of the completely identical calculation formulae desirably attains the simplicity and the high speed of the advanced processing with the two different types of the color difference components CDh in the horizontal direction, which are comparable to the conventional simple processing.

As clearly understood from the comparison between FIG. 5A and FIG. 5B, the calculation formulae used for computation of the color difference components CDv in the vertical direction are significantly similar to the calculation formulae used for computation of the color difference components CDh in the horizontal direction. Namely the processing flow can be standardized for computation of both the color difference components CDv and CDh in the two different directions. This further enhances the simplicity and the high speed of the overall processing.

At step S102 in the flowchart of FIG. 3, the raw image data captured by the image sensor 24 is converted into the color difference components CDv in the vertical direction and the color difference components CDh in the horizontal direction. It is preferable, although not essential, to apply low-pass filters to the color difference components CDv in the vertical direction and the color difference components CDh in the horizontal direction for the purpose of removal of possible noise from these color difference components. As explained later, the color image data generation process of the embodiment uses the color difference components for detection of the edge directions included in the image. Application of the low-pass filters is generally undesirably since the low-pass filters have a tendency to blur the edges and lower the detection accuracy of the edges. The procedure of this embodiment, however, enables detection of the edge directions with extremely high accuracy as described later. Some blur of the edges thus does not significantly lower the detection accuracy, but the noise removal enables stable detection of the edge directions.

Figures 6A, 6B:
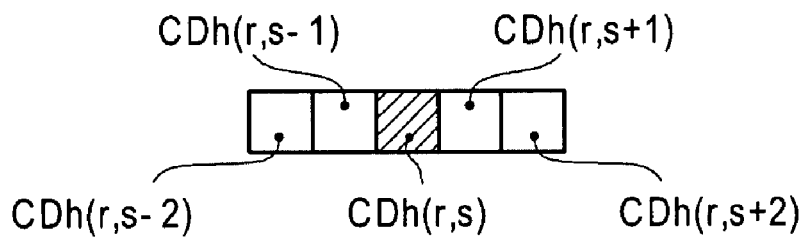
FIG. 6A and FIG. 6B show low-pass filters applied for removal of noise included in color difference components.

FIG. 6A and FIG. 6B show low-pass filters applied for removal of noise included in color difference components. FIG. 6A shows low-pass filters to be applied to the color difference components CDv in the vertical direction and to be applied to the color difference components CDh in the horizontal direction. For the better understanding, FIG. 6B shows application of the low-pass filter to the color difference component CDh in the horizontal direction. A target pixel as an object of application of the low-pass filter is represented by a hatched rectangle in FIG. 6B. The low-pass filter of this embodiment sums up a color difference component in the target pixel and color difference components in two pixels on the left and two pixels on the right of the target pixel. The color difference component of the target pixel is multiplied by a weight of four pixels, so that the summed color difference components correspond to eight pixels. In this case, simple 3-bit shift of the sum to the lower bit gives a color difference component of one pixel, which is equivalent to a division of the sum by 8. Such weighting enables the high-speed processing with the low pass filter.

Each of the color difference components CDv in the vertical direction and the color difference components CDh in the horizontal direction may represent the color difference component between the G component and the R component or the color difference component between the G component and the B component, as explained previously. The low pass filters are applicable to the color difference components CDv in the vertical direction and the color difference components CDh in the horizontal direction without taking into account such different types of the color difference components. The color image data generation process of the embodiment thus attains the extreme simplicity and the high speed of the advanced processing.

Referring back to the flowchart of FIG. 3, after computation of the color difference components CDv in the vertical direction and the color difference components CDh in the horizontal direction in the above manner, the color image data generation process of the embodiment creates an edge direction map with these data on the color difference components (edge direction map creation process) (step S104). The edge direction map shows the orientation of each edge included in the image as either the vertical direction or the horizontal direction. The direction of an edge may be set in advance in all the pixels, but in the present embodiment, the edge direction is set for pixels (R pixels and B pixels) other than the G pixels in order to speed up processing.

A detailed description will be given hereinafter. In the color image data generation process of the present embodiment, processing is performed for interpolating color components that are missing (e.g., the R component and the B component in the case of a G pixel, the G component and the B component in the case of an R pixel, and the G component and the R component in the case of a B pixel) in the raw image data while the edge direction map is referenced. The inclusion of noise in the edge direction map makes it impossible to appropriately interpolate the color components missing from the raw image data. Therefore, once the edge direction map is generated, processing (edge noise removal process) is performed for removing noise (edge noise) in the edge direction map prior to interpolation of the missing color components (step S106). The edge noise removal process will be described in detail hereinafter.

Once the edge noise in the edge direction map is removed, the CPU determines the tone value of the G component in each target pixel other than the G pixel (that is, either the R pixel or the B pixel) by interpolation (G component interpolation process) (step S106). The G component interpolation process refers to the edge direction map and performs interpolation with the values of the G component in adjacent pixels to determine the adequate value of the G component in the non-G target pixel. The details of this G component interpolation process will be described later.

The CPU subsequently performs interpolation of the remaining color component in the non-G target pixel other than the G pixel (non-G pixel interpolation process) (step S108). The G component of the non-G target pixel, which may be the R pixel or the B pixel, has already been determined by interpolation at preceding step S106. The processing of step S108 thus interpolates the B component for the R target pixel, while interpolating the R component for the B target pixel. The pixels other than the G pixels accordingly have obtained all the color components R, G, and B. The details of the non-G pixel interpolation process (interpolation of the remaining color component after interpolation of the G component with regard to each non-G target pixel other than the G pixel) will be described later.

On completion of the interpolation in the pixels other than the G pixels, the CPU interpolates the missing color components (the R component and the B component) of the raw image data with regard to each G target pixel (G pixel interpolation process) (step S110). The G pixel interpolation process also refers to the edge direction map and performs interpolation to determine the adequate values of the missing color components in the G target pixel. The details of this G pixel interpolation process will be described later.

On completion of the interpolation of the missing color components in the pixels other than the G pixels (step S106 and step S108) and the interpolation of the missing color components in the G pixels (step S110), all the pixels have obtained all the color components R, G, and B.

All the color components R, G, and B are thus obtained by interpolation along the edge direction based on the edge direction map, so that all the R, G, and B components should be appropriate. However, as described above, the edge directions set in the edge direction map are any one of vertical direction or horizontal direction. Of course, an actual image may include an edge in the oblique (e.g., diagonal) direction. At a portion where the oblique edge is present, interpolation is performed along a direction different from the actual edge direction. Thus, the occurrence of an error is concerned. In the color image data generation process shown in FIG. 3 of the embodiment, the CPU executes an oblique edge portion correction process in which the values of R, G, and B components obtained at that portion, that is, the oblique edge portion, is corrected (step S112). The details of the oblique edge portion correction process will be described later.

The CPU subsequently outputs the obtained RGB color components as color image data generated from the raw image data (step S114) and terminates the color image data generation process of FIG. 3.

As described above, the color image data generation process of this embodiment detects the edge directions based on the color difference components CDv in the vertical direction and the color difference components CDh in the horizontal direction to create the edge direction map. More specifically the edge directions are detected according to the two different types (the color difference component between the G component and the R component and the color difference component between the G component and the B component) of the color difference components CDv in the vertical direction and the color difference components CDh in the horizontal direction, whereby the edge direction map is generated with good precision. Furthermore, executing the process for removing noise from the edge direction map generated in this manner makes it possible to generate an even more precise edge direction map. Application of this extremely accurate edge direction map enables adequate interpolation of the missing color components for the raw image data.

The edge direction map creation process is rather simple and is executable at high speed. In addition, the edge directions set in the edge map are simply set in any one of the vertical direction or the horizontal direction, so that it is possible to generate the edge direction map at further high speed. It is also possible to execute, at high speed, interpolation of the missing components while referring to the edge direction map. Because the edge directions set in the edge direction map are simply set to any one of the vertical direction or horizontal direction, at a portion at which the edge in the oblique direction is present in an actual image, R, G, and B components obtained through interpolation may possibly include an error. Then, when the missing components are interpolated by referring to the edge direction map, a portion at which an oblique edge is present is picked up and then the process of correcting the interpolated components is executed only on that portion. As a result, in the color image data generation process of the embodiment, the raw image data with the mosaic arrangement of the R, G, and B components enables high-speed generation of appropriate color image data.

Hereinafter, to implement the above described functions, various processes executed in the color image data generation process of the embodiment, that is, the process of creating the edge direction map (edge direction map creation process), the process of interpolating the G component (G component interpolation process), the process of interpolating the remaining missing color component, other than the G component, in a pixel (non-G pixel interpolation process), the process of interpolating missing color components in a G pixel (G pixel interpolation process), and the process of picking up a portion at which an oblique edge is present and correcting the interpolated components only on that portion (oblique edge portion correction process), will be described.

C. Edge Direction Map Creation Process

Figure 7:
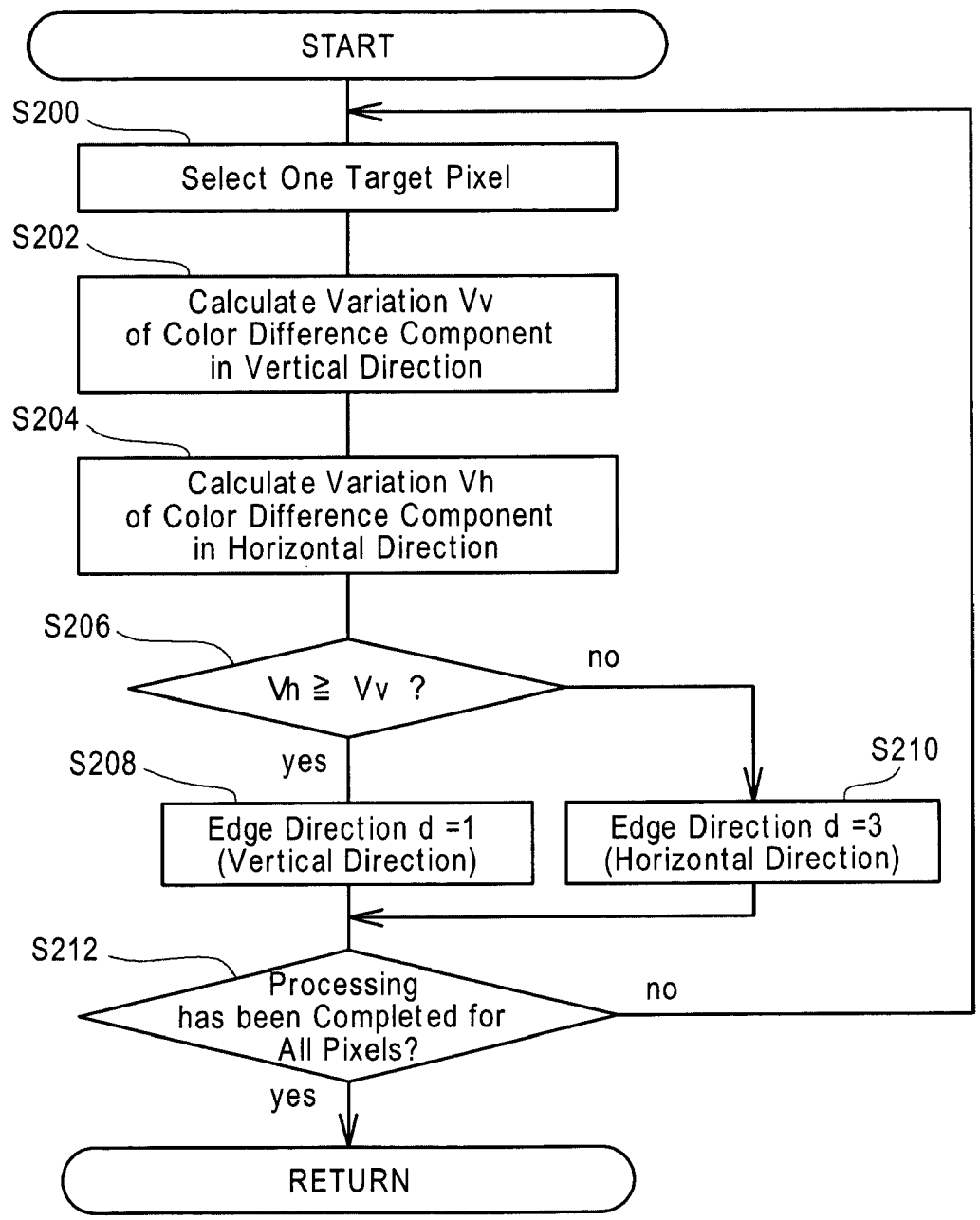
FIG. 7 is a flowchart showing the details of an edge direction map creation process executed in the color image data generation process of FIG. 3 by the image processing apparatus of the embodiment.

FIG. 7 is a flowchart showing the details of the edge direction map creation process executed at step S104 in the color image data generation process of FIG. 3 by the image processing apparatus 30 of the embodiment.

The edge direction map creation process first selects one target pixel as an object of detection of the edge direction (step S200) and calculates a variation amount Vv of the color difference component in the vertical direction (step S202). The variation amount Vv in the vertical direction is calculated naturally from the color difference components CDv in the vertical direction.

FIG. 8A and FIG. 8B show calculation of the variation amount Vv in the vertical direction from the color difference components CDv in the vertical direction. FIG. 8A shows a calculation formula, and FIG. 8B conceptually shows calculation of the variation amount Vv in the vertical direction according to the calculation formula of FIG. 8A. A hatched rectangle in FIG. 8B represents the position of a target pixel. The computation process of the variation amount Vv in the vertical direction first calculates the square of a difference between the color difference components CDv in the target pixel and a pixel above the target pixel. Similarly the computation process calculates the square of a difference between the color difference components CDv in the target pixel and a pixel below the target pixel. Open arrows shown between the hatched target pixel and its two vertically neighboring pixels in FIG. 8B represent computation of the squares of the differences between the color difference components CDv of the respective pixels.

After computation of the squares of the respective differences between the color difference components CDv in the target pixel and the upper and the lower pixels, the computation process similarly calculates the squares of respective differences between the color difference components CDv in a pixel on the left of the target pixel and pixels above and below the pixel on the left of the target pixel, as well as the squares of respective differences between the color difference components CDv in a pixel on the right of the target pixel and pixels above and below the pixel on the right of the target pixel. FIG. 8B shows the six squares obtained from the six pairs of pixels arrayed in the vertical direction. The summation of these six squares is specified as the variation amount Vv in the vertical direction with regard to the target pixel.

Referring back to the flowchart of FIG. 7, after calculation of the variation amount Vv in the vertical direction, the edge direction map creation process calculates a variation amount Vh of the color difference component in the horizontal direction (step S204). The variation amount Vh in the horizontal direction is calculated in the similar manner to the calculation of the variation amount Vv in the vertical direction except the use of the color difference components CDh in the horizontal direction for the computation.

FIG. 9A and FIG. 9B show calculation of the variation amount Vh in the horizontal direction from the color difference components CDh in the horizontal direction. FIG. 9A shows a calculation formula, and FIG. 9B conceptually shows calculation of the variation amount Vh in the horizontal direction according to the calculation formula of FIG. 9A. As shown by open arrows in FIG. 9B, the computation process successively calculates the squares of respective differences between the color difference components CDh in a target pixel and its two horizontally neighboring pixels (that is, pixels on the left and on the right of the target pixel), the squares of respective differences between the color difference components CDh in a pixel above the target pixel and pixels on the left and on the right of the pixel above the target pixel, and the squares of respective differences between the color difference components CDh in a pixel below the target pixel and pixels on the left and on the right of the pixel below the target pixel. The summation of these six squares is specified as the variation amount Vh in the horizontal direction with regard to the target pixel.

Referring back again to the flowchart of FIG. 7, the variation amount Vv in the vertical direction and the variation amount Vh in the horizontal direction calculated as described above are compared each other with regard to the target pixel (step S206). When the variation amount Vh in the horizontal direction is greater or equal than the variation amount Vv in the vertical direction (step S206: yes), it is determined that an edge goes through the target pixel in the vertical direction. A value "d" representing the edge direction is then set equal to "1" (step S208). When the variation amount Vv in the vertical direction is greater than the variation amount Vh in the horizontal direction (step S206: no), on the contrary, it is determined that an edge goes through the target pixel in the horizontal direction. The value "d" representing the edge direction is then set equal to "3" (step S210). Namely the pixel with the edge direction "d" set to "1" has the edge in the vertical direction, whereas the pixel with the edge direction "d" set to "3" has the edge in the horizontal direction.

The squares of the differences between the color difference components are calculated in determination of the variation amount Vv in the vertical direction (see FIG. 8A and FIG. 8B) and in determination of the variation amount Vh in the horizontal direction (see FIG. 9A and FIG. 9B). Such calculation enables detection of the edge directions without taking into account the signs of the differences between the color difference components. One possible modification may thus calculate the absolute values of respective differences between the color difference components, instead of calculation of their squares. The summation of the absolute values with regard to the adjacent pixels gives the variation amount Vv in the vertical direction or the variation amount Vh in the horizontal direction. The square, however, enhances the difference between the color difference components, compared with the absolute value and thus increases the detection accuracy of the edge direction. It should be understood that this invention is not limited to the absolute or square differences and that any other difference or similarity measure can be used instead to determine edge directions.

Some attention is required for the comparison between the variation amount Vv in the vertical direction and the variation amount Vh in the horizontal direction. There are accordingly some variations in edge direction map creation process shown in FIG. 7 as described below.

FIG. 10A to FIG. 10D show possible arrangements of adjacent pixels around a target pixel selected for detection of the edge direction. The adjacent pixels around the selected target pixel satisfy one of the four states shown in FIG. 10A to FIG. 10D. In the state of FIG. 10A, a target pixel column of a target pixel and its two neighbors in the vertical direction gives the squares of respective two color difference components CDgr between the G component and the R component, whereas pixel columns in the vertical direction on the left and on the right of the target pixel column give the squares of respective four color difference components CDgb between the G component and the B component. The variation amount Vv in the vertical direction is accordingly computed as the sum of the two squares of the color difference components CDgr and the four squares of the color difference components CDgb. The variation amount Vh in the horizontal direction is similarly computed as the sum of the two squares of the color difference components CDgr and the four squares of the color difference components CDgb. The simple comparison between the variation amount Vv in the vertical direction and the variation amount Vh in the horizontal direction thus enables adequate detection of the edge direction in the target pixel.

In the state of FIG. 10B, each of the variation amount Vv in the vertical direction and the variation amount Vh in the horizontal direction is computed as the sum of the two squares of the color difference components CDgb and the four squares of the color difference components CDgr. The simple comparison between the variation amount Vv in the vertical direction and the variation amount Vh in the horizontal direction thus enables adequate detection of the edge direction in the target pixel.

This is, however, not satisfied in the state of FIG. 10C or in the state of FIG. 10D. For example, in the state of FIG. 10C, the variation amount Vv in the vertical direction is computed as the sum of the two squares of the color difference components CDgb and the four squares of the color difference components CDgr. The variation amount Vh in the horizontal direction is, however, computed as the sum of the two squares of the color difference components CDgr and the four squares of the color difference components CDgb. Namely the variation amount Vv in the vertical direction is not simply comparable with the variation amount Vh in the horizontal direction. In the state of FIG. 10D, the variation amount Vv in the vertical direction is also not simply comparable with the variation amount Vh in the horizontal direction.

In order to address this problem, the amount of variation of the color difference component may be computed using different weights for the pixel column in which the target pixel is present and the pixel columns in which the target pixel is not present. For example, in FIG. 11A, an example of a calculation formula is shown for calculating the variation amount Vv in the vertical direction, and FIG. 11B shows an example of a calculation formula for calculating the variation amount Vh in the horizontal direction. In these calculation formulas, the weight in the pixel column in which the target pixel is present is set to twice the weight in the pixel columns in which the target pixel is not present. Through the use of such a calculation formula, the variation amount Vv in the vertical direction and the variation amount Vh in the horizontal direction can be compared with each other for the pixels shown in FIG. 10C and the pixels shown in FIG. 10D, and the edge direction can be determined. In the calculation formulas shown in FIG. 11A and FIG. 11B, the weight in the pixel column in which the target pixel is present is set to twice the weight in the pixel columns in which the target pixel is not present, but the weight in the pixel columns in which the target pixel is not present may also be set to half the weight in the pixel column in which the target pixel is present. Alternatively, a calculation formula such as the one shown in FIG. 12A and FIG. 12B may also be used to calculate the variation amount Vv in the vertical direction and the variation amount Vh in the horizontal direction.

Alternatively and more simply, the edge direction may be determined only for the pixel (R pixel) of FIG. 10A and the pixel (B pixel) of FIG. 10B. As previously described using FIG. 2, G pixels account for half the area of a Bayer color filter, half the remaining area are R pixels, and the other half are B pixels. Consequently, if the edge direction is determined for only the R pixels and the B pixels, the determination is made for half the number of pixels, and the edge direction map can therefore be rapidly generated. It is, of course, impossible to obtain an edge direction by the G pixels using this method. However, since the pixels (that is, the R pixels and the B pixels) for which the edge direction is known are arranged in a checkered flag pattern, even when the edge direction of the G pixels is not known, adverse effects on image quality can be prevented through the use of an interpolation method.

In order to accelerate processing in the present embodiment, the method for determining the edge direction is employed only for the pixels shown in FIG. 10A and FIG. 10B. Consequently, in step S200 of the edge direction map creation process shown in FIG. 7, a pixel other than a G pixel (that is, an R pixel or a B pixel) is selected as the target pixel. The vertical-direction variation amount Vv and the horizontal-direction variation amount Vh of the color difference component are then calculated for the selected target pixel (steps S202, S204), and the edge direction is determined by comparing the variation amount Vv and the variation amount Vh (steps S206 through S210), after which a determination is made as to whether the edge direction has been determined for all the target pixels (that is, the R pixels and the B pixels) (step S212). When there is any unprocessed pixel (step S212: no), the edge direction map creation process returns to step S200 to select another target pixel among unprocessed pixels and executes the subsequent series of processing. On completion of detection of the edge directions with regard to all the pixels (step S212: yes), the edge direction map creation process of FIG. 7 is terminated.

The edge direction map creation process of the embodiment enables detection of the edge directions included in the raw image data to be determined with good precision. The reason that an accurate edge direction map can be generated in the edge direction map creation process of the present embodiment will be described hereinafter.

As shown in FIGS. 2 and 4, the raw image data based on the Bayer color filter array have data of any color component R, G, or B at only discrete pixel positions. The G component has data at the rate of 1 per 2 pixels (G pixels), while the R component and the B component have data at the rate of 1 per 4 pixels (R pixels and B pixels). Because of such discrete appearance of data, it is difficult to detect the edge with high accuracy from a variation in tone value with regard to each of the color components R, G, and B.

The color difference components are accordingly used instead of the R, G, and B color components. With regard to each pixel column or pixel row having an alternate arrangement of the G component and the R component, the raw image data is converted into data of color difference components between the G component and the R component. With regard to each pixel column or pixel row having an alternate arrangement of the G component and the B component, the raw image data is converted into data of color difference components between the G component and the B component. The bottom of FIG. 4 shows conversion of the raw image data into the color difference components CDv in the vertical direction and the color difference components CDh in the horizontal direction. The pixel columns and the pixel rows having the color difference components between the G component and the B component are shown as hatched rectangles in FIG. 4.

Unlike the samples of raw data which constitute the mosaic of color components, the above conversion of raw data to color difference components allows for continuous signals to be obtained in at least the direction of the pixel columns or the direction of the pixel rows. Since color difference components obtained in pixel columns (or pixel rows) that are adjacent to each other differ from each other in meaning, it may not be meaningful to compare the values of color difference components between adjacent pixel columns. Consequently, when color difference components having the same meaning are used to detect an edge (e.g., the color difference components indicating the difference between the G components and the B components indicated by hatched lines in FIG. 4 are used to detect an edge), the adjacent pixel column may be skipped, and the color difference component of every other pixel column may be used.

Significant variations of either or both of the color difference component between the G component and the R component and/or the color difference component between the G component and the B component usually occur in an image area having an abrupt change in lightness and/or color. An edge is thus detectable as changes in color difference components.

The edge direction map creation process of the embodiment detects the edge directions with high accuracy based on the above consideration and accordingly gives a highly accurate edge direction map. This concrete procedure converts the raw image data based on the Bayer color filter array into the color difference components CDv in the vertical direction and the color difference components CDh in the horizontal direction. As shown in the bottom of FIG. 4, the obtained data of the color difference components have an alternate arrangement of pixel columns or pixel rows of the color difference component between the G component and the R component and pixel columns or pixel rows of the color difference component between the G component and the B component. The variations of the color difference components are then calculated according to the calculation formulae of FIG. 11A and FIG. 11B, or FIG. 8A and FIG. 9A. The calculated variations are obtained from the color difference components of adjacent pixel columns or adjacent pixel rows having different types. The variations calculated even from the color difference components having different types are comparable for the edge detection as described above. Such edge detection according to the color difference components of the adjacent pixel columns or the adjacent pixel rows ensures highly accurate detection of even a small-scale edge. The accurate detection of the edge direction in each pixel is thus enabled by the comparison between the variation amount Vv in the vertical direction and the variation amount Vh in the horizontal direction.

As clearly understood from this explanation, in the edge direction map creation process of the embodiment, it is important to compute the variation amount Vv in the vertical direction and the variation amount Vh in the horizontal direction based on the color difference components of adjacent pixel columns or adjacent pixel rows. In other words, it is not so important what calculation formulae are used for the computation of the variation amount Vv in the vertical direction and the variation amount Vh in the horizontal direction. Diverse calculation formulae are thus applicable in place of the calculation formulae in FIG. 11A and FIG. 11B, or FIG. 8A and FIG. 9A. For example, the variation amount Vv of the vertical direction and the variation amount Vh of the horizontal direction can also be calculated using a calculation formula such as the one shown in FIG. 12A and FIG. 12B.

D. G Component Interpolation Process

As is described with reference to FIG. 3, in the color image data generation process of the present embodiment, when the edge direction map is generated (step S104), processing for interpolating the G component in non-G pixels (R pixels and B pixels) is initiated (step S106).

Figure 13:
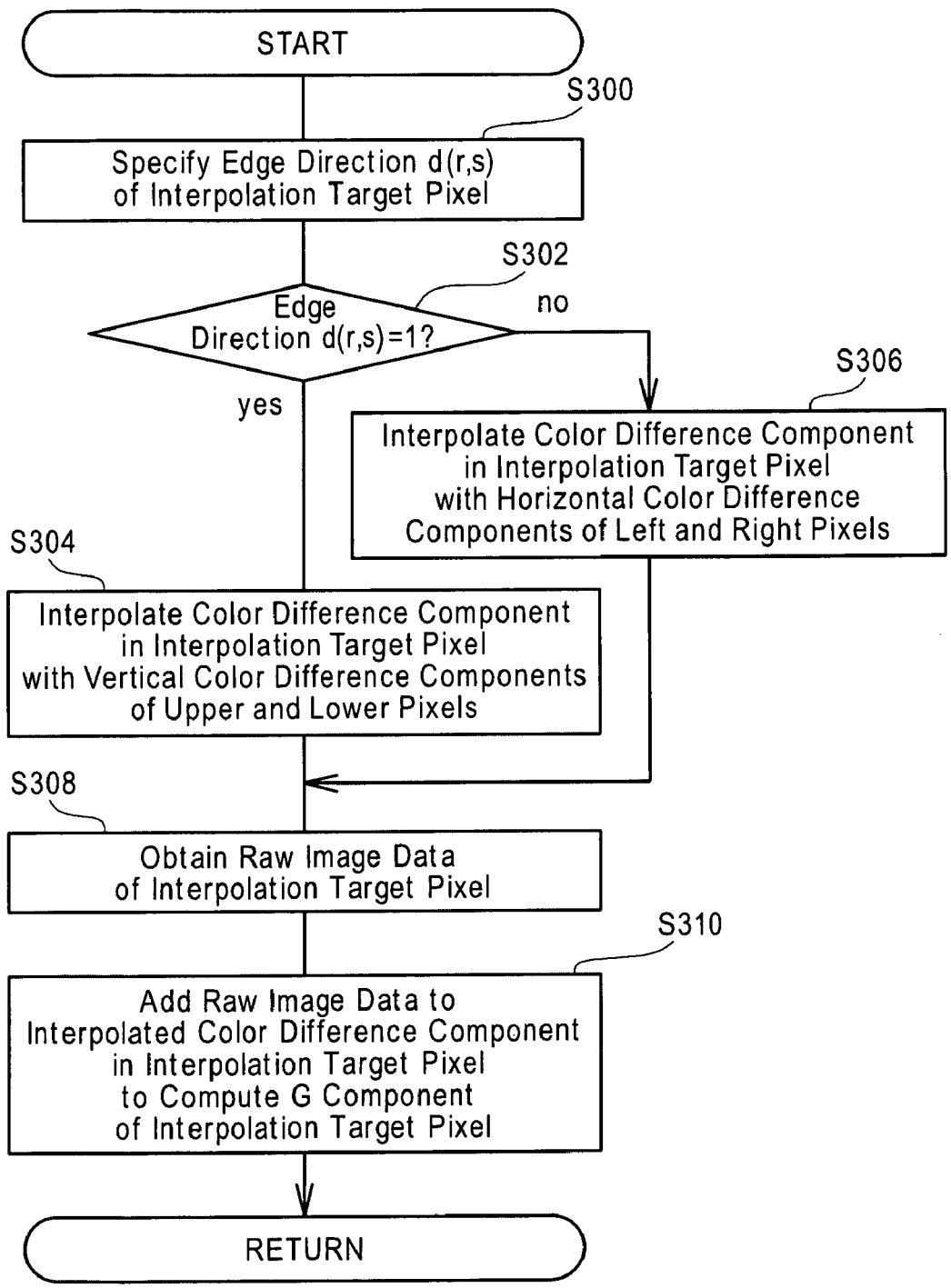
FIG. 13 is a flowchart showing the details of a G component interpolation process executed in the color image data generation process of FIG. 3 by the image processing apparatus of the embodiment.

FIG. 13 is a flowchart showing the details of the G component interpolation process of interpolating the G component in the R pixels and the B pixels. The G component interpolation process first refers to the created edge direction map to specify the edge direction "d" in each interpolation target pixel as an object of interpolation (step S300). As previously mentioned, there are cases in which the edge direction map includes edge directions d set for all pixels and in which the edge direction map includes edge directions d set only for non-G pixels (R pixel and B pixel). However, since the pixels being interpolated herein are non-G pixels (R pixels and B pixels), an edge direction d can always be acquired by referencing the edge direction map.

The G component interpolation process subsequently determines whether the specified edge direction "d" is equal to "1" (step S302). When the specified edge direction "d" is equal to "1" (step S302: yes), a color difference component of the interpolation target pixel is interpolated with the color difference components of pixels above and below the interpolation target pixel (step S304). When the specified edge direction "d" is equal to "3" (step S302: no), on the other hand, the color difference component of the interpolation target pixel is interpolated with the color difference components of pixels on the left and on the right of the interpolation target pixel (step S306). The G component interpolation process then obtains the raw image data of the interpolation target pixel (step S308) and adds the raw image data to the interpolated color difference component of the interpolation target pixel to compute the G component of the interpolation target pixel (step S310). This series of processing is described more in detail below.

Figure 14:
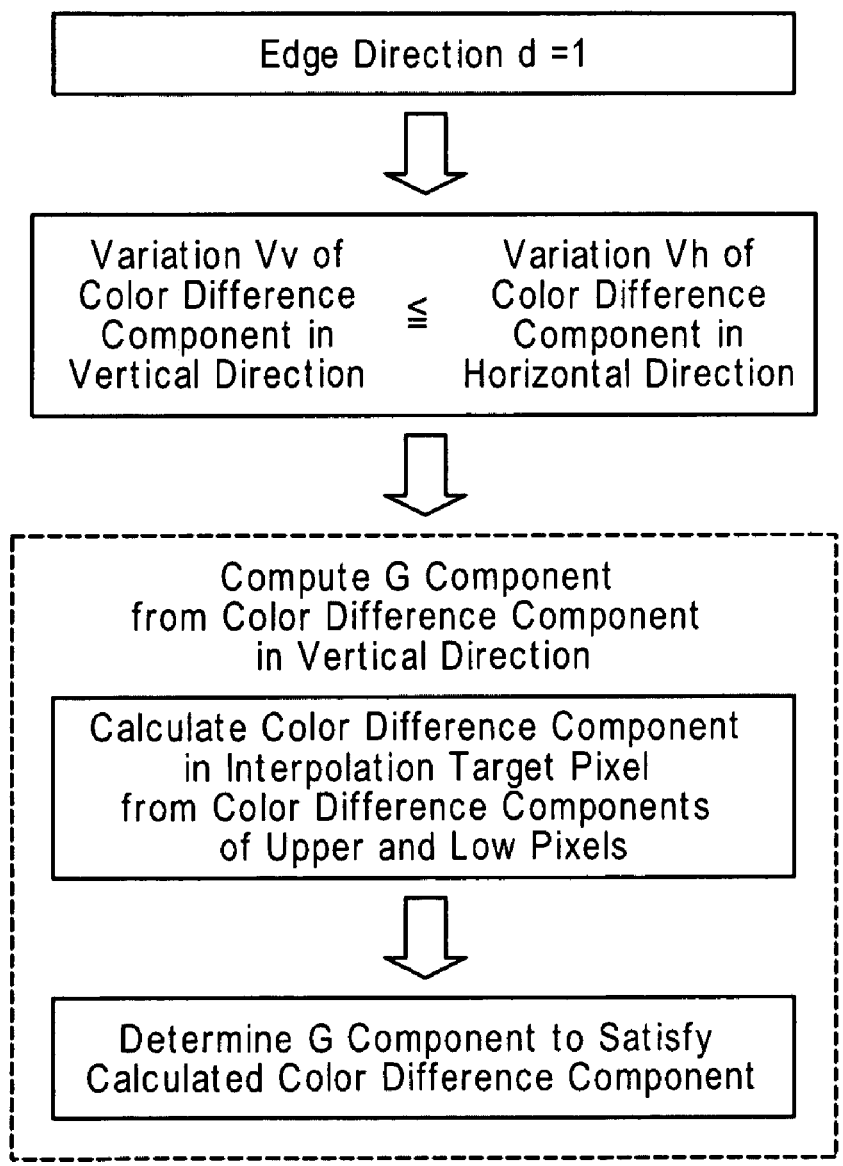
FIG. 14A to FIG. 14C schematically show a process of computing a missing G component in a non-G pixel.

FIG. 14A, FIG. 14B, and FIG. 14C show a processing flow of computing a missing G component in a non-G pixel. The interpolation target pixel is a non-G pixel, that is, either an R pixel or a B pixel. When the interpolation target pixel is the R pixel, the adjacent pixels are arranged as shown in FIG. 14A. When the interpolation target pixel is the B pixel, on the other hand, the adjacent pixels are arranged as shown in FIG. 14B. It is here assumed that the interpolation target pixel as the object of interpolation of the G component is the R pixel and that the specified edge direction "d" is equal to "1".

At the edge direction "d" equal to "1", the variation amount Vh of the color difference component in the horizontal direction is equal to or greater than the variation amount Vv of the color difference component in the vertical direction. In general, interpolation in the state of a less variation (closer to the steady state) is expected to have the better interpolation result than interpolation in the state of a greater variation. The color difference component in the vertical direction having a less variation is thus used for the computation of the G component. As clearly understood from FIG. 14A, in the R interpolation target pixel, both the color difference component in the vertical direction and the color difference component in the horizontal direction are obtained by subtraction of the R component from the G component. Namely the G component of the interpolation target pixel is computable from either the color difference component in the vertical direction or the color difference component in the horizontal direction. For the enhanced interpolation accuracy, the G component of the interpolation target pixel is computed from the color difference component in the vertical direction having a less variation, as already indicated by the value "1" of the corresponding edge-direction indicator "d" in the interpolation target pixel.

The color difference component in the vertical direction is subtraction of the R component from the G component, and the raw image data obtained in the interpolation target pixel is the R component. Addition of the raw image data to the color difference component thus immediately determines the G component in the interpolation target pixel. The color difference component used for computation of the G component may be the color difference component in the interpolation target pixel calculated according to the calculation formulae of FIG. 5A and FIG. 5B. Preferably the color difference component used for computation of the G component may be the color difference component after removal of noise with the low-pass filter shown in FIG. 6A and FIG. 6B.

The color difference component of the interpolation target pixel may be calculated from the color difference components of adjacent pixels, instead of being directly read. This modified procedure may read the color difference components of the upper and the lower pixels above and below the interpolation target pixel in the vertical direction and calculate the color difference component in the interpolation target pixel from the readout color difference components. The G component interpolation process of FIG. 13 calculates the color difference component of the interpolation target pixel from the color difference components of the adjacent pixels at step S304 or at step S306. Another modified procedure may read the color difference components of the pixels in a larger neighborhood of the interpolation target pixel in order to calculate the color difference component in the interpolation target pixel from the readout color difference components.

After computation of the G component in all the interpolation target pixels as described above, the CPU terminates the G component interpolation process of FIG. 13 and goes back to the color image data generation process of FIG. 3. Once the G component is interpolated, the color image data generation process subsequently starts the non-G pixel interpolation process to interpolate the remaining color component in the pixels other than the G pixels.

E. Non-G Pixel Interpolation Process

Figure 15:
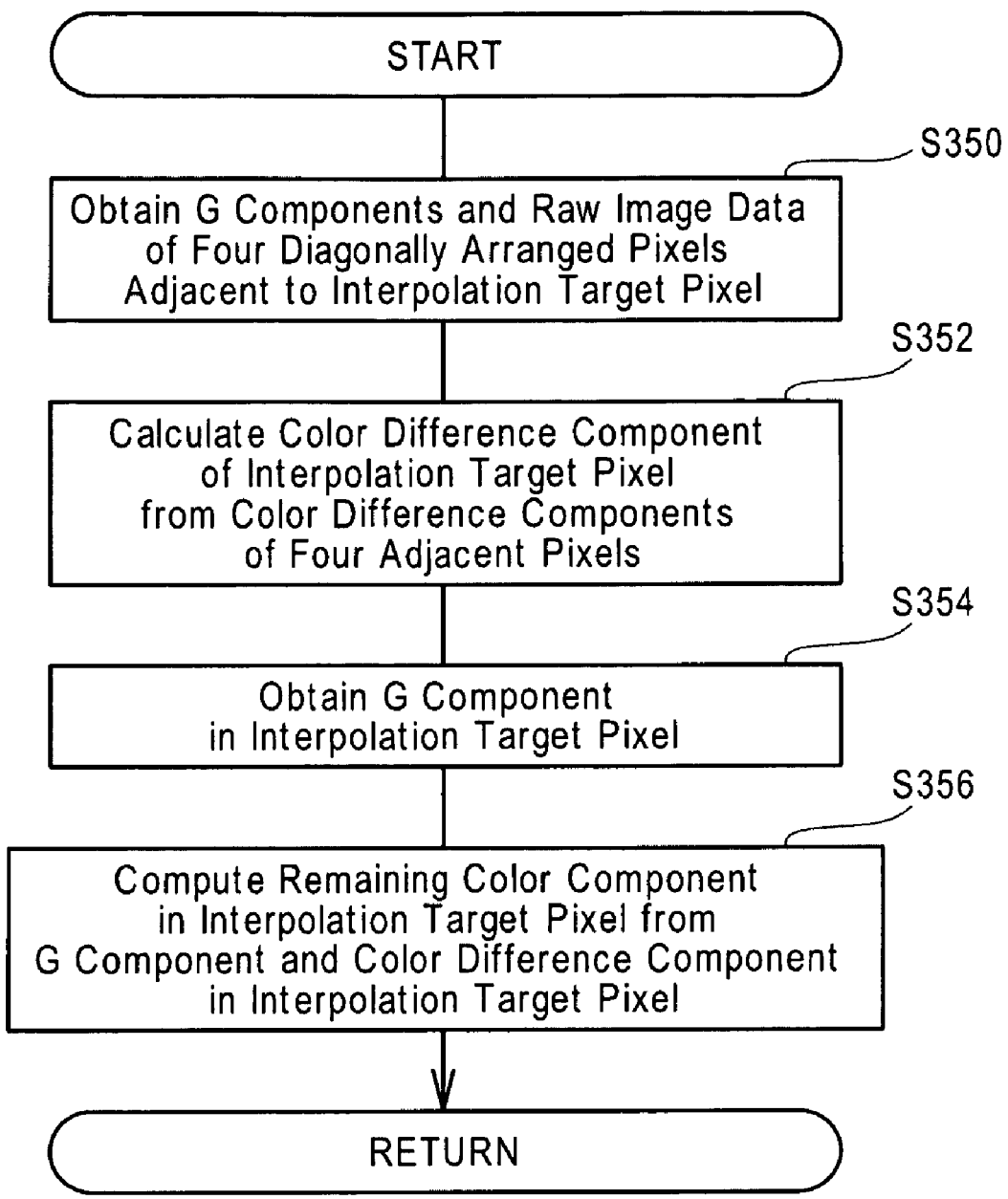
FIG. 15 is a flowchart showing the details of a non-G pixel interpolation process executed in the color image data generation process of FIG. 3 by the image processing apparatus of the embodiment.

FIG. 15 is a flowchart showing the details of the non-G pixel interpolation process. As explained previously, the non-G pixel interpolation process interpolates the remaining color component in each non-G pixel, that is, the B component in the R pixel or the R component in the B pixel, after interpolation of the G component in the non-G pixel. The basic concept of the non-G pixel interpolation process is briefly described, prior to the processing details.

The non-G pixel interpolation process interpolates the B component in the R pixel, while interpolating the R component in the B pixel. When the interpolation target pixel is the R pixel, four diagonally arranged pixels adjacent to the interpolation target pixel are all B pixels as shown in FIG. 14A. The B component is obtained as the raw image data of these four adjacent pixels. When the interpolation target pixel is the B pixel, on the other hand, four diagonally arranged pixels adjacent to the interpolation target pixel are all R pixels as shown in FIG. 14B. The R component is obtained as the raw image data of these four adjacent pixels. The simplest procedure performs interpolation with the raw image data of the four diagonally arranged pixels adjacent to the interpolation target pixel to determine the tone value of the remaining color component in the interpolation target pixel. For example, the R component in the interpolation target pixel can be obtained as average of four raw R components available in diagonally surrounding pixels. Similarly, the B component in the interpolation target pixel can be obtained as average of four raw B components available in diagonally surrounding pixels.

The direct interpolation of the remaining color component with the raw image data of the adjacent pixels may cause the occurrence of aliasing colors due to some deviation in difference from the other color component. In natural color images, the RGB data is significantly correlated both in the intra- and inter-channel senses. This means that the pixels in local image areas usually have similar color difference characteristics. It is accordingly preferable to interpolate the color difference component in the interpolation target pixel with the color difference components of the adjacent pixels and determine the tone value of the remaining color component in the interpolation target pixel based on the interpolated color difference component. Thus, instead of the direct interpolation with the raw image data of the four diagonally arranged pixels adjacent to the interpolation target pixel, another available procedure calculates the color difference component of the interpolation target pixel from the color difference components of the four adjacent pixels and determines the tone value of the remaining color component in the interpolation target pixel based on the calculated color difference component of the interpolation target pixel. For example, the interpolation object is the B component for the R interpolation target pixel in the state of FIG. 14A. The preferable procedure obtains the color difference components between the G component and the B component in the four diagonally arranged B pixels adjacent to the R interpolation target pixel and uses these four color difference components to calculate the corresponding color difference component in the R interpolation target pixel. For example, the color difference component in the interpolation target location can be calculated as average of available color difference components. The procedure then calculates the tone value of the remaining color component from the calculated color difference component and the interpolated G component in the R interpolation target pixel.

The diagonally arranged pixels adjacent to the R interpolation target pixel are all B pixels. Both the color difference components CDv in the vertical direction and the color difference components CDh in the horizontal direction computed with regard to these adjacent pixels according to the calculation formulae of FIG. 5A and FIG. 5B are the color difference components between the G component and the B component. The corresponding color difference component of the interpolation target pixel may be calculated from the total eight color difference components. One procedure may calculate the average of the color difference component CDv in the vertical direction and the color difference component CDh in the horizontal direction in each of the four diagonally arranged pixels adjacent to the interpolation target pixel as a representative color difference component in the pixel and determine the corresponding color difference component of the interpolation target pixel from the representative color difference components of the four adjacent pixels. Another procedure may detect the edge direction in the interpolation target pixel and calculate the color difference component of the interpolation target pixel from only the color difference components (obtained according to the calculation formulae of FIG. 5A and FIG. 5B) of the adjacent pixels satisfying the detected edge direction. This method of determining the color difference component of the interpolation target pixel by taking into account both the color difference components CDv in the vertical direction and the color difference components CDh in the horizontal direction with regard to the adjacent pixels requires the rather complicated series of processing. The calculation based on the G component and the B component in the four diagonally arranged pixels adjacent to the interpolation target pixel, on the other hand, enables the higher-speed determination of the color difference component CDgb in the interpolation target pixel.

Based on this basic concept, the non-G pixel interpolation process of the embodiment shown in the flowchart of FIG. 15 interpolates the remaining color component in each non-G pixel, after interpolation of its G component. The concrete procedure of the non-G pixel interpolation process is explained with reference to the flowchart of FIG. 15.

The non-G pixel interpolation process first obtains the G components and the raw image data of the four diagonally arranged pixels adjacent to the interpolation target pixel (step S350). When the interpolation target pixel is the R pixel, the four diagonally arranged adjacent pixels are all B pixels as shown in FIG. 14A. The raw image data of these adjacent pixels obtained here accordingly regards the B component. When the interpolation target pixel is the B pixel, on the other hand, the four diagonally arranged adjacent pixels are all R pixels as shown in FIG. 14B. The raw image data of these adjacent pixels obtained here accordingly regards the R component.

The non-G pixel interpolation process subsequently calculates the color difference components of these four adjacent pixels by subtraction of the G component from the raw image data and computes the average of the four color difference components as the color difference component of the interpolation target pixel (step S352). In the application hereof, the color difference component generally represents subtraction of the R component or the B component from the G component as shown in FIG. 5A and FIG. 5B. The calculation of step S352, however, changes the sign of the color difference component by subtraction of the G component from the raw image data (the R component or the B component). This saves changing the sign in the later computation.

After computation of the color difference component in the interpolation target pixel, the non-G pixel interpolation process obtains the G component of the interpolation target pixel (step S354). The interpolation target pixel is the non-G pixel, so that the raw image data of the interpolation target pixel does not regard the G component. The G component of the interpolation target pixel has, however, been already determined by the G component interpolation process of FIG. 13 executed prior to this non-G pixel interpolation process.

Summation of the color difference component of the interpolation target pixel computed at step S352 and the G component obtained at step S354 determines the remaining color component in the interpolation target pixel (step S356).

After computation of the remaining color component in all the non-G interpolation target pixels as described above, the CPU terminates the non-G pixel interpolation process of FIG. 15 and goes back to the color image data generation process of FIG. 3. The color image data generation process subsequently starts the G pixel interpolation process to interpolate the missing color components in the G pixels.

F. G Pixel Interpolation Process

Figure 16:
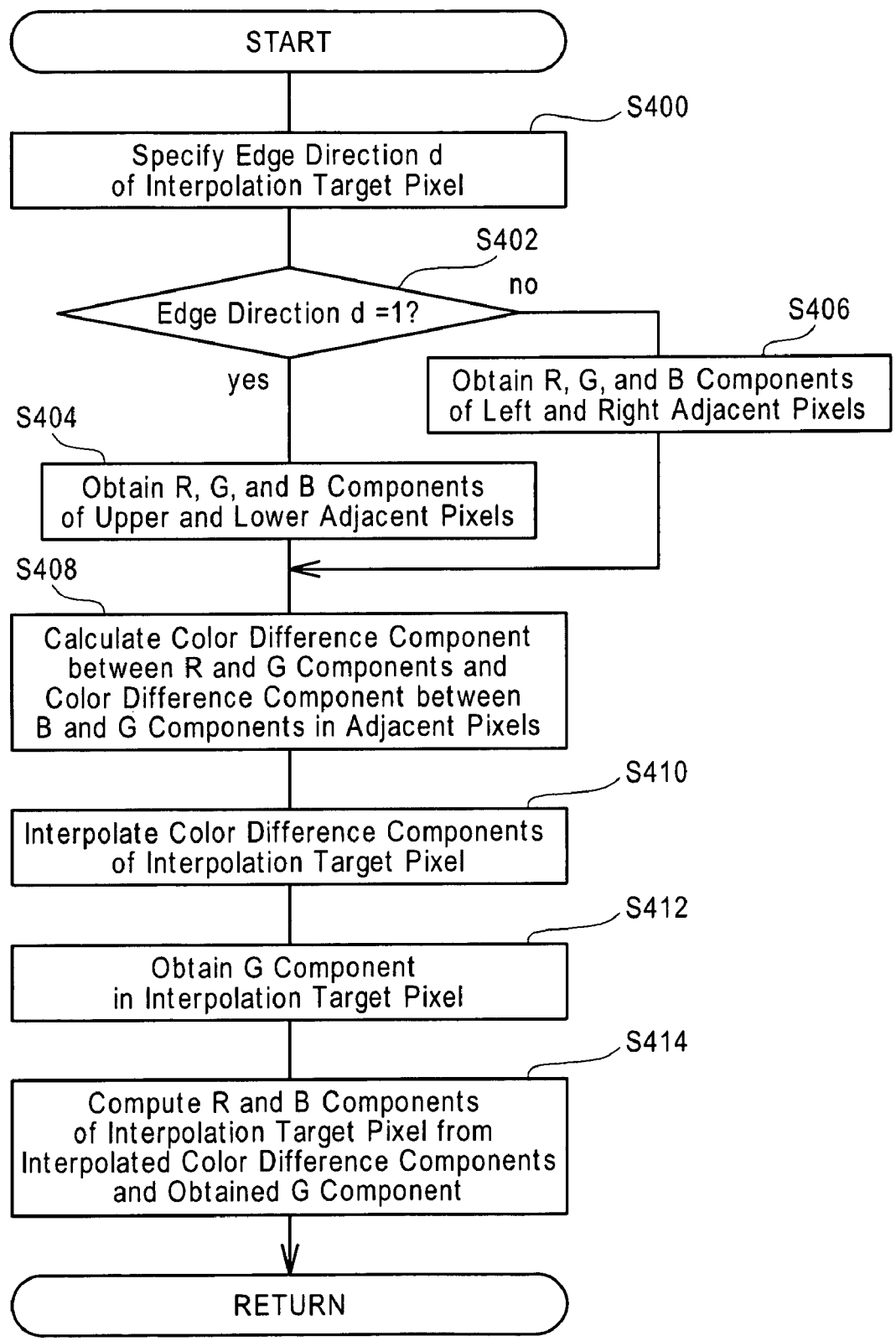
FIG. 16 is a flowchart showing the details of a G pixel interpolation process executed in the color image data generation process of FIG. 3 by the image processing apparatus of the embodiment.

FIG. 16 is a flowchart showing the details of the G pixel interpolation process. The G pixel interpolation process first specifies the edge direction "d" in each interpolation target pixel as an object of interpolation (step S400). The edge directions have been detected in advance and set in the edge direction map by the edge direction map creation process of FIG. 7. As previously mentioned, the edge direction may be determined for all of the pixels, but to accelerate processing in the present embodiment, the edge direction is determined only for non-G pixels (R pixels and B pixels), and edge directions are not determined for the G pixels. However, as shown in FIG. 2, since the G pixels are surrounded by non-G pixels on the periphery thereof, and edge directions in the non-G pixels are calculated, the edge directions in the G pixels that are to be interpolated can be estimated from the edge directions of the peripheral pixels.

Figure 17A:
FIG. 17A to FIG. 17D show estimation of an edge direction in a G interpolation target pixel from edge directions of adjacent pixels.
Figure 17B:

FIG. 17A to FIG. 17D show estimation of the edge direction in the interpolation target pixel from the edge directions of the adjacent pixels. The G pixel interpolation process interpolates the missing (that is, R and B) color components in the G pixels. The original pixels of raw data surrounding the interpolation target pixel satisfy either of an arrangement of FIG. 17A or an arrangement of FIG. 17B. In FIG. 17A and FIG. 17B, a hatched rectangle represents the interpolation target pixel. This estimation is performed on the assumption that the edge directions have been detected for only the non-G pixels. The edge directions have accordingly been set in four adjacent pixels above, below, on the left, and on the right of the interpolation target pixel.

Figure 17C:
Figure 17D:

FIG. 17C and FIG. 17D show arrangements of the edge directions "d" in the four adjacent pixels of the interpolation target pixel. In the arrangement of the edge directions "d" of the four adjacent pixels shown in FIG. 17C, the number of the adjacent pixels having the edge direction "d" set to "1" is greater than the number of the adjacent pixels having the edge direction "d" set to "3". It is accordingly adequate to estimate the edge direction "d" of the interpolation target pixel as "1". In the arrangement of the edge directions "d" of the four adjacent pixels shown in FIG. 17D, on the other hand, the number of the adjacent pixels having the edge direction "d" set to "3" is greater than the number of the adjacent pixels having the edge direction "d" set to "1". It is accordingly adequate to estimate the edge direction "d" of the interpolation target pixel as "3".

In this manner, the estimation procedure counts the number of the adjacent pixels having the edge direction "d" set to "1" and the number of the adjacent pixels having the edge direction "d" set to "3" and specifies the edge direction "d" of the greater count as the edge direction "d" of the interpolation target pixel. Instead of counting the respective numbers of the adjacent pixels, another estimation procedure may calculate the sum of the edge directions "d" set in the four adjacent pixels above, below, on the left, and on the right of the interpolation target pixel. When there are the same numbers of the adjacent pixels having the edge direction "d" set to "1" and the adjacent pixels having the edge direction "d" set to "3", the sum of the edge directions "d" is equal to "8". When the sum of the edge directions "d" is less than "8", it is expected that the greater number of the adjacent pixels have the edge direction "d" set to "1". The edge direction "d" of the interpolation target pixel is thus specified as "1". When the sum of the edge directions "d" is greater than "8", on the other hand, it is expected that the greater number of the adjacent pixels have the edge direction "d" set to "3". The edge direction "d" of the interpolation target pixel is thus specified as "3". When the sum of the edge directions "d" is equal to "8" (when there are the same numbers of the adjacent pixels having the edge direction "d" set to "1" and the adjacent pixels having the edge direction "d" set to "3"), the edge direction "d" of the interpolation target pixel may be specified as either "1" or "3".

As described above, when the edge directions "d" have been set for all the pixels, the G pixel interpolation process of FIG. 16 simply reads the edge direction "d" of the interpolation target pixel from the edge direction map at step S400. When the edge directions "d" have been set for only the non-G pixels, on the other hand, the G pixel interpolation process reads the edge directions of adjacent pixels adjoining to the interpolation target pixel from the edge direction map and estimates the edge direction "d" of the interpolation target pixel at step S400.

After specification of the edge direction "d" in the interpolation target pixel, the G pixel interpolation process determines whether the specified edge direction "d" is equal to "1" (step S402). When the specified edge direction "d" is equal to "1" (step S402: yes), it is determined that the edge goes through the interpolation target pixel in the vertical direction. The G pixel interpolation process accordingly obtains the R component, the G component, and the B component of the upper and the lower adjacent pixels above and below the interpolation target pixel (step S404). As shown in the arrangements of FIGS. 17A and 17B, the upper and the lower adjacent pixels above and below the interpolation target pixel are always the non-G pixels. The missing color components of the non-G pixels have already been computed by the G component interpolation process of FIG. 13 and the non-G pixel interpolation process of FIG. 15. The R, G, and B components of these upper and the lower adjacent pixels are thus immediately obtainable.

When the specified edge direction "d" is not equal to "1" (step S402: no), on the other hand, it is determined that the edge goes through the interpolation target pixel in the horizontal direction. The G pixel interpolation process accordingly obtains the R component, the G component, and the B component of the left and the right adjacent pixels on the left and on the right of the interpolation target pixel (step S406). Since the left and the right adjacent pixels on the left and on the right of the interpolation target pixel are always the non-G pixels, the R, G, and B components of these left and right adjacent pixels are immediately obtainable.

The G pixel interpolation process then calculates the color difference components in the adjacent pixels as the objects of acquisition of the R, G, and B components (step S408). When the edge direction "d" of the interpolation target pixel is equal to "1" (step S402: yes), the G pixel interpolation process calculates the color difference components in the upper and the lower adjacent pixels. When the edge direction "d" of the interpolation target pixel is not equal to "1" (step 402: no), on the other hand, the G pixel interpolation process calculates the color difference components in the left and the right adjacent pixels. As in the non-G pixel interpolation process of FIG. 15, the sign-changed color difference components are obtained at step S408 by subtraction of the G component from the R component and by subtraction of the G component from the B component. This saves changing the sign in the later computation of the R component and the B component in the interpolation target pixel.

After calculation of the color difference components in the upper and the lower adjacent pixels or in the left and the right adjacent pixels (step S408), the G pixel interpolation process performs interpolation with the calculated color difference components of the adjacent pixels to compute the color difference components of the interpolation target pixel (step S410). As mentioned above, the color difference components calculated in the upper and the lower adjacent pixels or in the left and the right adjacent pixels are the sign-changed color difference components (that is, the color difference components by subtraction of the G component from the R component and the color difference components by subtraction of the G component from the B component). The interpolated color difference components are thus the sign-changed color difference components.

The G pixel interpolation process then obtains the G component of the interpolation target pixel (step S412). Since the interpolation target pixel is the G pixel, the raw image data directly regards the G component. The G pixel interpolation process subsequently computes the R component and the B component in the interpolation target pixel from the interpolated color difference components and the obtained G component of the interpolation target pixel (step S414). Since the interpolated color difference components are the sign-changed (that is, the green component subtracted from the red component, and the green component subtracted from the blue component) color difference components, simple addition of the G component to the interpolated color difference components determines the R component and the B component of the interpolation target pixel.

After computation of the missing color components (the R component and the B component) in all the G pixels as described above, the CPU terminates the G pixel interpolation process of FIG. 16 and goes back to the color image data generation process of FIG. 3.

On completion of the G pixel interpolation process (step S110 of FIG. 3), the demosaicing process, that is, interpolation of the missing color components has been concluded for all the pixels. The CPU then outputs the R, G, and B components of the respective pixels as the color image data generated from the raw image data (step S112) and terminates the color image data generation process of FIG. 3.

The digital camera 100 of the embodiment performs demosaicing of the raw image data to generate the color image data according to the series of processing described below in detail. The color image data generation process creates the edge direction map, prior to the demosaicing process. By taking into account the variations of the color difference components CDv in the vertical direction and the color difference components CDh in the horizontal direction, the edge directions of the respective pixels are detectable from the color difference components of the two different types (that is, the color difference components between the G component and the R component and the color difference components between the G component and the B component). This ensures highly accurate detection of even small-scale edges and accordingly enables creation of the accurate edge direction map. The subsequent demosaicing process refers to this accurate edge direction map to adequately interpolate the missing color components in the respective pixels.

Both the edge direction map creation process and the interpolation of the missing color components are rather simple and are executable at high speed. The series of processing in the embodiment thus enables high-speed generation of adequate color image data from raw image data with a mosaic arrangement of the R, G, and B color components.

However, as described above, because the edge directions set in the edge direction map are any one of vertical direction or horizontal direction, at a portion at which the edge in the oblique direction is present in an actual image, obtained R, G, and B components may possibly include an error. To obtain further adequate color image data, in the color image data generation process of the embodiment, color image data is generated from raw image data (steps S106 to S110 of FIG. 3) and then the oblique edge portion correction process that corrects the obtained R, G, and B components is executed only on the portion of the color image data, of which the edge is oriented obliquely (oblique edge portion) (step S112).

G. Oblique Edge Portion Correction Process

Figure 18:
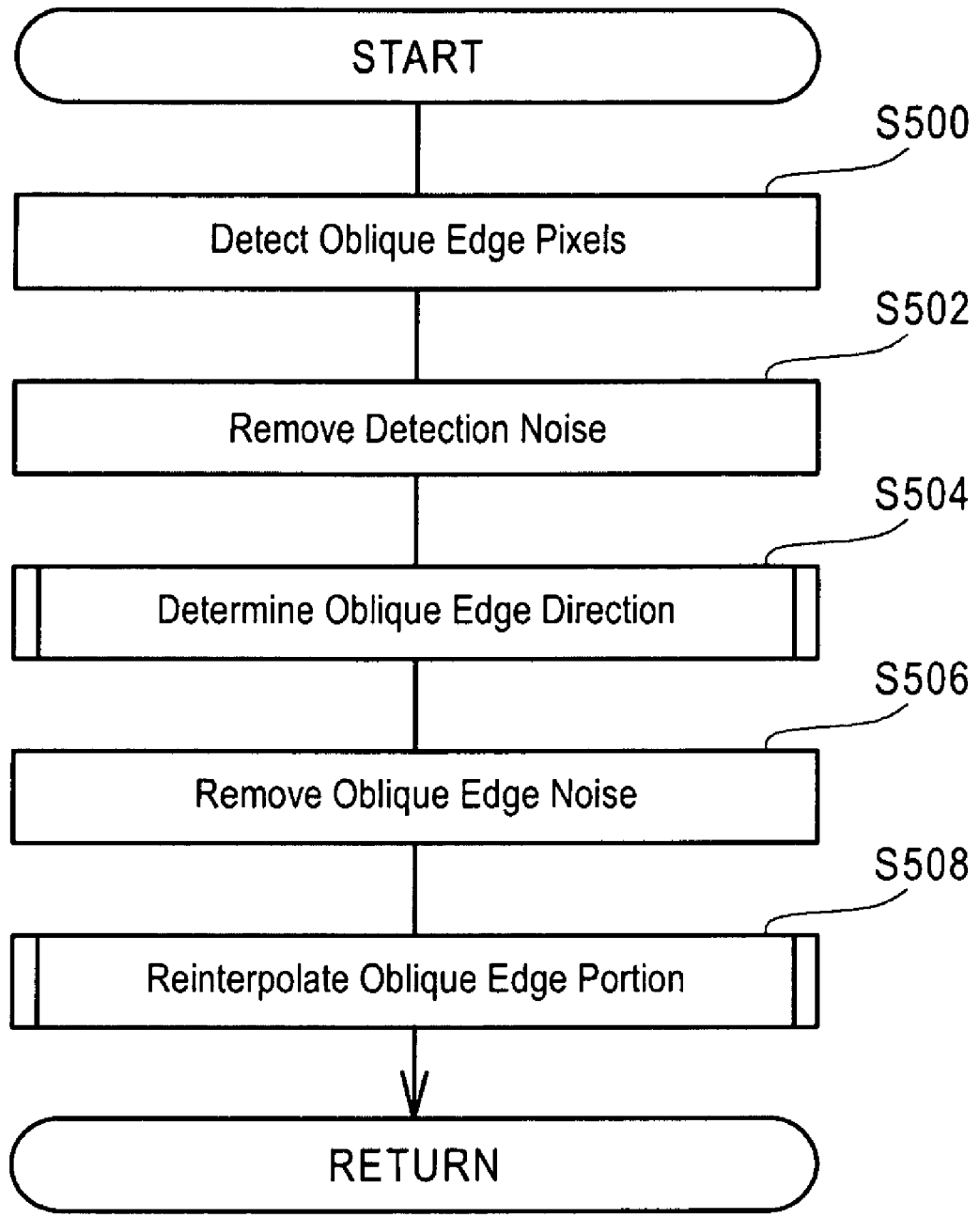
FIG. 18 is a flowchart showing the details of an oblique edge portion correction process executed in the color image data generation process of FIG. 3 by the image processing apparatus of the embodiment.

FIG. 18 is a flowchart showing the details of the oblique edge portion correction process executed in the color image data generation process of FIG. 3 by the image processing apparatus 30 of the embodiment. Hereinafter, the details of the oblique edge portion correction process will be described. For easier understanding, the outline of the process that uses the flowchart of FIG. 18 will be described first and, on the basis of the description, individual processes will be described.

As shown in the flowchart of FIG. 18, in the oblique edge portion correction process, the process of detecting an oblique edge pixel is initially executed (step S500). The oblique edge pixel is a pixel located at a portion at which an edge is oriented obliquely. This process will be executed after all the R, G, and B color components are obtained through interpolation. Thus, detection of an oblique edge pixel may be executed using the components obtained through interpolation. Of course, when an oblique edge pixel is detected, false detection, such as erroneously detecting a pixel as the oblique edge pixel or not detecting an actual oblique edge pixel as an oblique edge pixel, may occur. When such detected noise is present among the detected oblique edge pixels, it is difficult to appropriately execute the subsequent processes. For this reason, detection noise (or detected noise) is removed from the detected oblique edge pixels (step S502). The details of the process of detecting these oblique edge pixels and then removing detected noise will be described later.

After the oblique edge pixel has been detected, the process of determining the direction of the oblique edge, that is, whether the edge is oriented in the right downward direction or in the right upward direction, is executed (step S504). The oblique edge pixels may include an error in the R, G, and B components obtained through interpolation. To determine the oblique edge direction, the edge direction is determined using color difference components obtained from the raw image data rather than using directly the R, G, and B components obtained through interpolation. In addition, when the oblique edge direction is determined, the edge direction may possibly be erroneously determined. For this reason, after the oblique edge directions are determined, erroneously determined edge directions (oblique edge noise) are removed (step S506). The details of the process of determining these oblique edge directions and then removing the oblique edge noise will be described later.

The oblique edge pixels and the oblique edge directions are thus obtained, and, with regard to the oblique edge pixels, the process of interpolating color components, missing in the raw image data, along the oblique edge directions is executed (step S508). By so doing, interpolation may be executed along the proper directions, so that color components may be appropriately interpolated. Since such interpolation increases time required for processing, the interpolation needs to be executed only on the oblique edge pixels, so that the actual processing time does not significantly increase. The details of the process of executing interpolation on the oblique edge pixels along the oblique edge directions will be described later.

When the above described all the processes are complete, appropriate R, G, and B components will be obtained for all the pixels including the portions at which the edge is oriented obliquely. Then, the CPU terminates the oblique edge portion correction process of FIG. 18 and goes back to the color image data generation process of FIG. 3. As a result, at step S114 of FIG. 3, the color image data of which R, G, and B components are appropriately interpolated will be output. Hereinafter, various processes executed in the oblique edge portion correction process will be specifically described.

G-1. Detection of Oblique Edge Pixel

As shown in FIG. 18, in the oblique edge portion correction process, the process of detecting an oblique edge pixel is initially executed (step S500). FIG. 19A to FIG. 19D are diagrams showing the method for detecting an oblique edge pixel. FIG. 19A shows determination formulae for detecting an oblique edge pixel. The CDc(r,s) term in the determination formulae represents a value obtained in the (r,s) pixel location by subtracting the B component from the R component (hereinafter, referred to as CDc component). That is, because the oblique edge portion correction process is executed after the series of the G component interpolation process (step S106 of FIG. 3), the non-G pixel interpolation process (step S108) and the G pixel interpolation process (step S110) has been executed on the raw image data in order to produce two missing color components in each pixel location, the values of R, G, and B components of all the pixels have been obtained.

Thus, subtracting the B component of a pixel from the R component thereof gives the CDc component of each of the pixels.

Once a pixel (target pixel), on which it will be determined whether it is an oblique edge pixel, is selected, CDc components of that target pixel and four adjacent pixels above, below, on the left, and on the right of the target pixel are calculated. Then, it is determined whether those five CDc components satisfy the determination formulae shown in FIG. 19A. Hereinafter, using the lower determination formula shown in FIG. 19A as an example, the meaning of the determination formula will be described with reference to FIG. 19B and FIG. 19C.

The first term (that is, a portion surrounded by the broken line) of the lower determination formula represents the CDc component of the target pixel. In addition, the second term (that is, a portion surrounded by the one-dot line) of the lower determination formula is an average of the CDc components of the adjacent pixels on the left and on the right of the target pixel. Thus, the lower determination formula determines whether the absolute value of a difference between the CDc component of the target pixel and the average of the CDc components of the left and right pixels is larger than the prescribed value "σ". This determination enables detection of the presence of an edge in the CDc component. For example, if the CDc component of the target pixel shown in FIG. 19B and the CDc components of the left and right adjacent pixels are values indicated by the solid circles shown in FIG. 19C, the average of the CDc components of the left and right pixels will be a value indicated by the open circle shown in FIG. 19C. Thus, as shown in FIG. 19C, when the CDc components of the pixels are arranged in the order of the adjacent pixel on the left of the target pixel, the target pixel, and the adjacent pixel on the right of the target pixel, and when the three CDc components are aligned substantially on the straight line, the left-hand value of the lower determination formula shown in FIG. 19A will be a small value. On the other hand, when the CDc components of these three pixels are not on the straight line, that is, when the variation of the CDc component between the target pixel and the left adjacent pixel largely differs from the variation of the CDc component between the target pixel and the right adjacent pixel and the edge of the CDc component is present, the left-hand value of the lower determination formula will be a large value. Thus, the lower determination formula shown in FIG. 19A focuses on the CDc components to detect a pixel in which the edge in the vertical direction is present.

The upper determination formula shown in FIG. 19A determines whether the absolute value of a difference between the CDc component of the target pixel and the average of the CDc components of the upper and lower pixels is larger than the prescribed value "σ". FIG. 19D shows the positional relationship between these three pixels. Among these three pixels, when the variation of the CDc component between the upper adjacent pixel and the target pixel largely differs from the variation of the CDc component between the target pixel and the lower adjacent pixel, the left-hand value of the upper determination formula will be a large value. Thus, the upper determination formula shown in FIG. 19A focuses on the CDc components to detect a pixel in which the edge in the horizontal direction is present.

Consequently, the determination formulae shown in FIG. 19A execute the process of focusing on the CDc components to detect a pixel in which the edge appears to be present in the horizontal direction and in the vertical direction, and determining the detected pixel as an oblique edge pixel, and setting the value to "1", indicating that the pixel is the oblique edge pixel, to a variable "α" that is used for storing the determination result.

It may be understood intuitively from the following consideration that detection of an oblique edge pixel is possible through the above method. It is assumed that the vertical edge is present at a certain position in an image. Then, it is believed that at that pixel position, at least one of the brightness or the color should largely vary in the horizontal direction and the color difference component also should largely vary in the horizontal direction. In contrast, the color difference component should not largely vary in the vertical direction. Here, any assumed color difference applies to substantially the same situation. On the contrary, if it is assumed that the horizontal-direction edge is actually present, the color difference component then should largely vary in the vertical direction but the color difference component should not largely vary in the horizontal direction. Furthermore, when no clear edge is present actually, the color difference component should not vary in the vertical direction or in the horizontal direction. As considered above, when the color difference component largely varies both in the vertical direction and in the horizontal direction, it is reasonably believed that the edge in an oblique direction is actually present at that location. The determination formulae shown in FIG. 19A determine that, on the basis of the above way of thinking, the oblique edge is present in the pixel in which the edge is detected both in the horizontal direction and in the vertical direction.

In addition, the determination formulae shown in FIG. 19A particularly use a CDc component as a color difference component for detection of an edge. This is because of the following reason. As described in the color image data generation process of FIG. 3, to interpolate missing color components in the raw image data and then generate color image data, G components are initially interpolated (step S106 of FIG. 3). Because the edge directions d in the edge direction map referenced at this time each are any one of vertical direction or horizontal direction, at portions at which the edge in the oblique direction is actually present, G components obtained through interpolation may include an error. Subsequently, the R components or the B components are interpolated using the obtained G components (step S108 and step S110 of FIG. 3). Thus, if an error is included in the G component, the error influences the R component and the B component. Therefore, by detecting the error in the color difference component between the R component and the B component (CDc component) it is possible to reliably detect the presence of an oblique edge.

In addition, for another possibility, if interpolation is performed erroneously along the horizontal edge at a portion at which the vertical edge is actually present, a large error may be included. In contrast, it may be considered that the edge in the oblique direction is an edge that varies in the vertical direction and in the horizontal direction. Even when interpolation is executed in a state where the edge in the oblique direction is regarded as either the vertical edge or the horizontal edge, a significantly large error will not be included.

At step S500 of the oblique edge portion correction process shown in FIG. 18, the process of detecting an oblique edge pixel is executed using the determination formula of FIG. 19A. It should be noted that, as is apparent from the above description, any pixel of G pixel, R pixel or B pixel may be detected as the oblique edge pixel.

After the oblique edge pixels are detected in this manner, the process of removing detected noise from the detected oblique edge pixels is executed (step S502 of FIG. 18). Here, the detected noise is a pixel that is not detected as an oblique edge pixel although the edge in the oblique direction is actually present or, conversely, a pixel that is detected as an oblique edge pixel although the edge in the oblique direction is not present. This detected noise may be easily picked up on the basis of a detected result in the surrounding pixels. That is, because the size of a pixel is substantially smaller than the size of the objects in the image, an edge in the image generally spans a plurality of pixels. Thus, when the edge in the oblique direction is present, oblique edge pixels that are successive in the oblique direction are normally detected. Thus, when a certain pixel is detected as an oblique edge pixel, and when no pixel that is detected as an oblique edge pixel is present in the oblique direction from that pixel, it may be considered that the pixel is erroneously detected as an oblique edge pixel. Conversely, even when a certain pixel that is not detected as an oblique edge pixel, if pixels that are detected as oblique edge pixels are successively present in the oblique direction from that pixel, it may be considered that the pixel is actually an oblique edge pixel. In this manner, the determination as to whether a certain pixel is an oblique edge pixel may be corrected by referencing the result of detection of an oblique edge pixel in the surrounding pixels. In the oblique edge portion correction process of the embodiment, as an oblique edge pixel is detected, it is determined on the basis of the above way of thinking whether the result of detection of the oblique edge pixel is accurate, and then an erroneously detected result is corrected.

Figure 20A:
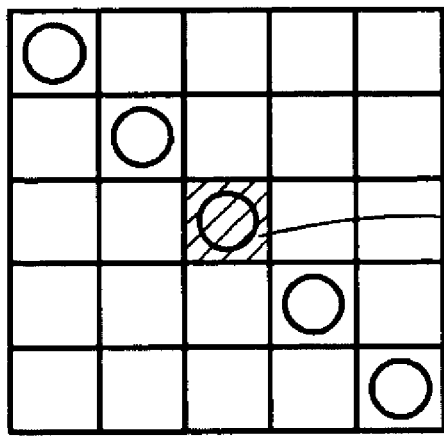
FIG. 20A and FIG. 20B are diagrams showing the method for determining whether the oblique edge pixel is accurately detected.
Figure 20B:
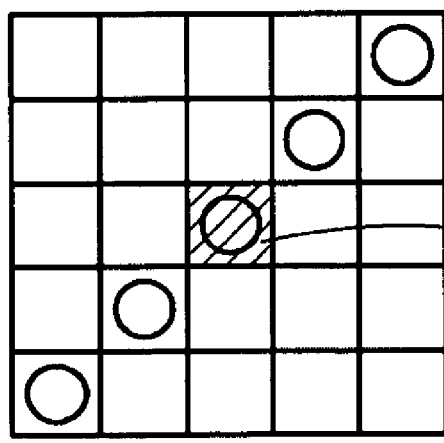

FIG. 20A and FIG. 20B are diagrams showing the method for determining whether the oblique edge pixel is accurately detected. The hatched pixels represent the target pixels. For determining whether the result of detection of the oblique edge pixel is accurate, the target pixel is first selected and then the result of detection of the oblique edge pixel is referenced with regard to five pixels marked with a circle in FIG. 20A. As described with reference to FIG. 19A, because "1" is set to the variable "α" that stores the detected result for the pixels detected as the oblique edge pixels, it is only necessary to read the value of the variable "α" set for each pixel. When three or more oblique edge pixels are detected from among these five pixels, the target pixel is also determined as the oblique edge pixel. In this case, if the value of the variable "α" of the target pixel is "0" that does not indicate the oblique edge pixel, the value is changed to "1" that indicates the oblique edge pixel. When the variable "α" has been already set to "1", the value of "α" remains unchanged.

When it is determined that three or more oblique edge pixels are not present in the five pixels marked with a circle shown in FIG. 20A, the same determination will be subsequently made on the five pixels marked with a circle shown in FIG. 20B. When three or more oblique edge pixels are included in the five pixels, the target pixel is determined to be the oblique edge pixel, and "0" is changed to "1" if the variable "α" of the target pixel is "0". In contrast, when three or more oblique edge pixels are not present in any directions of FIG. 20A and FIG. 20B although the target pixel is detected as the oblique edge pixel, it is determined that the target pixel is actually not an oblique edge pixel and the value of the variable "α" is changed to "0" that does not indicate the oblique edge pixel. Thus, at step S502 in the oblique edge portion correction process shown in FIG. 18, the process of removing detected noise from the detected oblique edge pixels is executed in the above-described manner.

G-2. Determination of Oblique Edge Direction

After the oblique edge pixels are detected and the detected noise is removed, the process of determining the edge direction is next executed on each oblique edge pixel (step S504). That is, it is determined whether the oblique edge direction is a right downward direction or a right upward direction. Note that, as described above, the edge direction "d" is determined only for the non-G pixels (R pixels and B pixels). In contrast, because the oblique edge pixel may possibly be any one of the G pixel, the R pixel, or the B pixel, the oblique edge direction may be determined not only for the R pixels or the B pixels but also for the G pixels.

Figure 21:
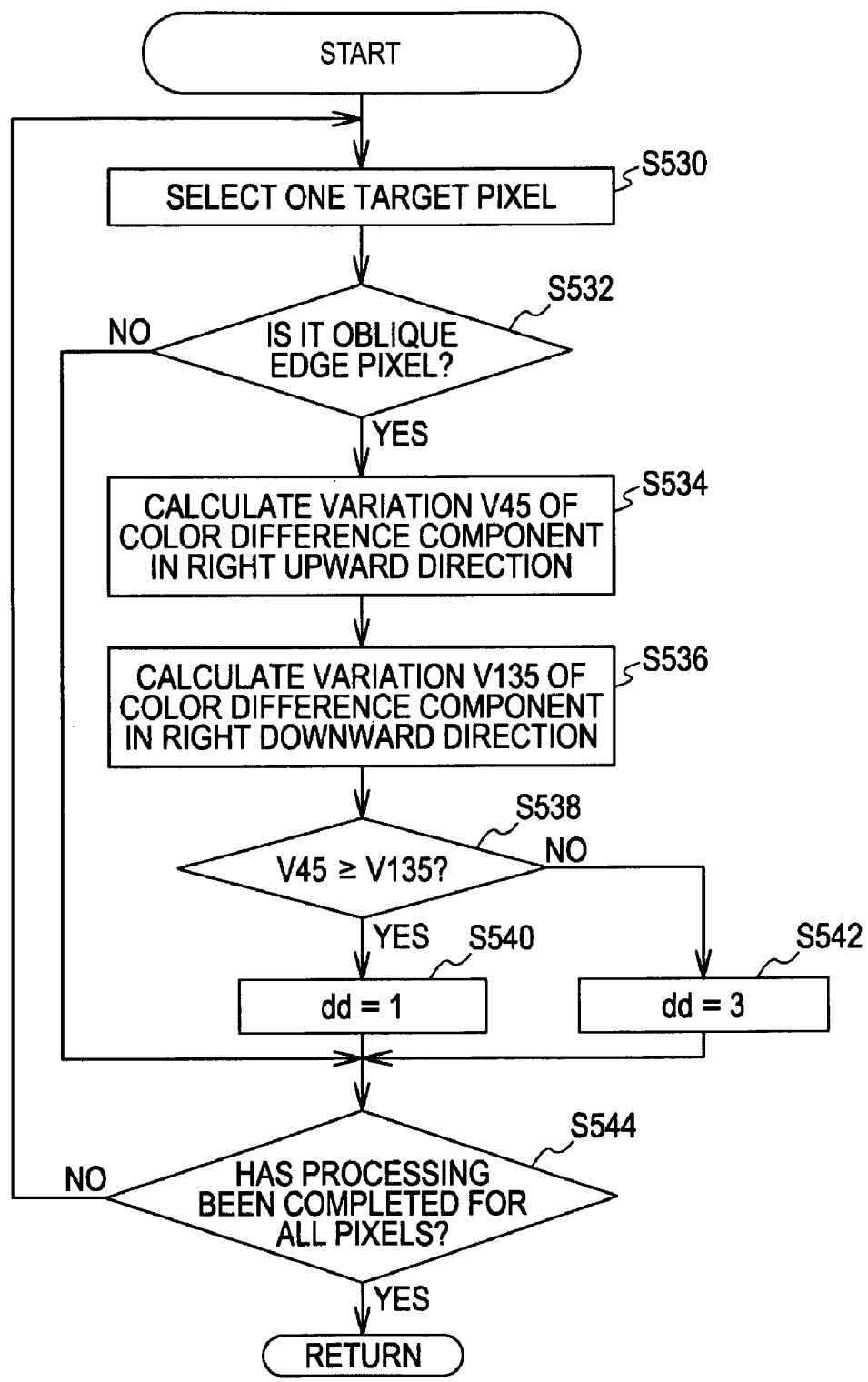
FIG. 21 is a flowchart showing the details of an oblique edge direction determination process, in which the edge direction of the oblique edge pixel is determined, executed in the oblique edge portion correction process of FIG. 18 by the image processing apparatus of the embodiment.

FIG. 21 is a flowchart showing the details of the process of determining the edge direction of each oblique edge pixel (oblique edge direction determination process). In the process of determining the oblique edge direction, one target pixel is initially selected (step S530) and it is determined whether the selected target pixel is an oblique edge pixel (step S532). Referencing the value of the variable "α" for the target pixel allows immediate determination as to whether the target pixel is an oblique edge pixel. When it is determined that the target pixel is not an oblique edge pixel (step S532: no), it will be determined whether the process is complete for all the pixels (step S544). When the process for all the pixels is not complete (step S544: no), the process goes back to selecting a new target pixel (step S530). In repeating the above process, when any target pixel is determined to be an oblique edge pixel (step S532: yes), the variation V45 of the color difference component in the right upward direction will be calculated first (step S534).

FIG. 22A and FIG. 22B show calculation of the variation V45 of the color difference component in the right upward direction. FIG. 22A shows a calculation formula for calculating the variation V45 of the color difference component in the right upward direction. FIG. 22B schematically shows the content of the calculation formula. The hatched pixel in FIG. 22B is a target pixel. Since in this embodiment the value of "α" has been determined only for R pixels or B pixels of the raw mosaic data, the target pixel can be either an R pixel or a B pixel. The variation V45 of the color difference component in the right upward direction is calculated in the following manner. The vertical-direction color difference component CDv and the horizontal-direction color difference component CDh of the target pixel are acquired first, and the summation of these color difference components is calculated. In addition, for the second pixel from the target pixel in the left downward direction, the vertical-direction color difference component CDv and the horizontal-direction color difference component CDh are acquired, and the summation of these color difference components is calculated. Furthermore, for the second pixel from the target pixel in the right upward direction as well, the vertical-direction color difference component CDv and the horizontal-direction color difference component CDv are acquired, and the summation of these color difference components is calculated. FIG. 22B shows these three pixels for which the vertical-direction color difference components CDv and the horizontal-direction color difference components CDh are acquired. As shown in FIG. 4, these three pixels correspond to the same type of pixels (either R pixels or B pixels) of the raw mosaic data which ensures that the comparison of the color difference components is meaningful.

Subsequently, the computation process calculates the square of a difference between the summation of the two color difference components obtained for the left lower pixel and the summation of the color difference components obtained for the target pixel. An open arrow shown between the left lower pixel and the target pixel in FIG. 22B represents calculation of the square of the difference between the summations of the color difference components of these pixels. Similarly, the computation process calculates the square of a difference between the summation of the obtained color difference components for the target pixel and the obtained color difference components of the upper right pixel. An open arrow shown between the target pixel and the upper right pixel in FIG. 22B represents calculation of the square of the difference between the summations of the color difference components of these pixels. Summation of the squares of the two differences obtained between these three pixels calculates the variation V45 of the color difference component in the right upward direction. At step S534 shown in FIG. 21, the variation V45 of the color difference component for the target pixel in the right upward direction is calculated in the above described manner.

Thereafter, the variation V135 of the color difference component for the target pixel in the right downward direction will now be calculated (step S536). The variation V135 in the right downward direction may also be calculated in a similar manner as the variation V45 in the right upward direction.

FIG. 23A and FIG. 23B show calculation of the variation V135 of the color difference component in the right downward direction. FIG. 23A shows a calculation formula for calculating the variation V135 of the color difference component in the right downward direction. FIG. 23B schematically shows the content of the calculation formula. When the variation V135 of the color difference component in the right downward direction is calculated, as shown in FIG. 23B, three pixels, consisting of a target pixel, the second pixel from the target pixel in the upper left direction and the second pixel from the target pixel in the lower right direction, are taken into account. As described above and shown in FIG. 4, these three pixels correspond to the same type of pixels (either R pixels or B pixels) of the raw mosaic data which ensures that the comparison of the color difference components is meaningful. Summation of the vertical-direction color difference component CDv and the horizontal-direction color difference component CDh is calculated for each of these pixels. Then, the computation process calculates the square of a difference between the summation obtained for the upper left pixel and the summation obtained for the target pixel. Furthermore, the computation process calculates the square of a difference between the summation obtained for the target pixel and the summation obtained for the lower right pixel. Summation of the squares of the obtained two differences calculates the variation V135 of the color difference component in the right downward direction. Thus, at step S536 shown in FIG. 21, the variation V135 of the color difference component for the target pixel in the right downward direction is calculated in the above described manner.

After the variation V45 of the color difference component in the right upward direction and the variation V135 of the color difference component in the right downward direction are calculated, these variations are compared (step S538). When the variation V45 in the right upward direction is greater than or equal to the variation V135 in the right downward direction (step S538: yes), it is determined that the oblique edge direction of the target pixel is a right downward direction to set the oblique edge direction dd to the value "1" that indicates the right downward direction (step S540). In contrast, when the variation V45 in the right upward direction is smaller than the variation V135 in the right downward direction (step S538: no), the oblique edge direction dd is set to the value "3" that indicates that the oblique edge direction is a right upward direction (step S542).

In this way, when the oblique edge direction dd is determined to be one of "1" or "3" with regard to the one oblique edge pixel. It is then determined whether the above process is complete for all the pixels (step S544). When there is any unprocessed pixel (step S544: no), the oblique edge direction determination process goes back to step S530 to select another target pixel among the unprocessed pixels and executes the subsequent series of processing. When all of the above-described operations are complete for all the pixels (step S544: yes), the CPU terminates the oblique edge direction determination process shown in FIG. 21 and goes back to the oblique edge portion correction process of FIG. 18.

As described above, in the oblique edge direction determination process, for all the oblique edge pixels that are detected as the oblique edge pixel (step S500 of FIG. 18) and from which the detected noise has been removed (step S502 of FIG. 18), the process of determining whether the edge direction is a right downward direction (oblique edge direction dd=1) or a right upward direction (oblique edge direction dd=3) is executed.

Note that, as described with reference to FIG. 19A to FIGS. 19D, R, G, and B components that are interpolated from the raw image data are used to detect an oblique edge pixel. In contrast, to determine the edge direction in each oblique edge pixel, not the interpolated R, G, and B components but color difference components, which are not interpolated, are used in order to increase the processing accuracy while making the proposed approach computationally efficient. This is because the following situation is considered. In each oblique edge pixel, interpolation is executed on the assumption of an edge direction that is different from a direction in which the edge is actually oriented. This may cause an error included in R, G, and B components that are obtained through interpolation. Determination of an oblique edge direction using the R, G, and B components that include an error would make it difficult to determine an accurate edge direction. For this reason, to determine an oblique edge direction accurately, color difference components, which are data before interpolation that is performed by taking into account an edge direction, are used to determine an oblique edge direction.

In addition, when the oblique edge direction is determined, the color difference component of the target pixel and the color difference components of the second pixels from the target pixel in the oblique direction from the target pixel are referenced. Referencing the color difference components of not the adjacent pixels but the second pixels from the target pixel is because the color difference components of the target pixel differs in type from the color difference components of each of the adjacent pixels and comparison between these color difference components makes no sense. That is, as shown in FIG. 4, the color difference components before interpolation alternately give the color difference components CDgr between the G component and the R component and the color difference components CDgb between the G component and the B component, so that, to compare color difference components with the color difference components of the target pixel, it is necessary to reference the color difference components of the second pixels from the target pixel.

However, when the oblique edge direction dd is determined, the edge direction may possibly be erroneously determined. For this reason, after the oblique edge directions dd are determined for all the oblique edge pixels, to remove an erroneously determined oblique edge direction (oblique edge noise), the process of removing the oblique edge noise is executed (step S506 of FIG. 18).

FIG. 24 shows the method for removing an oblique edge noise. To remove oblique edge noise, the characteristic of the oblique edge direction dd that pixels having the same oblique edge direction dd tend to successively appear when the determined oblique edge direction dd is accurate is used. By taking into account a target pixel as hatched in FIG. 24, the oblique edge directions dd that are set for the four diagonally adjacent pixels in the oblique direction (pixels marked with a circle in the drawing) are referenced. When these four pixels are oblique edge pixels, any one of values "1" and "3" then indicates that the oblique edge direction dd in these pixels is being set. On the other hand, when these four pixels are not an oblique edge pixel, the corresponding oblique edge direction dd in these pixels has a value of "0". When three or more pixels have the same oblique edge direction dd among the oblique edge directions dd of these four pixels, that oblique edge direction dd is determined to be the accurate oblique edge direction dd of the target pixel. Thus, when the target pixel has the same oblique edge direction dd as the surrounding pixels, it is determined that the accurate oblique edge direction dd has been set for the target pixel. When the target pixel has the oblique edge direction dd different from those of the oblique edge directions dd of the surrounding pixels, it is determined to be oblique edge noise, and the oblique edge direction dd of the target pixel is changed to the oblique edge direction dd equal to those of the surrounding pixels. At step S506 of FIG. 18, the above-described operations are executed on all the detected oblique pixels to execute the process of removing oblique edge noise.

After removing the oblique edge noise in the above-described manner, pixels (oblique edge pixels) in which the edge is oriented obliquely and the edge directions (oblique edge directions dd) thereof will be accurately obtained. Subsequently, the process of reinterpolating R, G, and B components in the oblique edge pixels along the accurate oblique edge directions dd is executed (step S508 of FIG. 18).

G-3. Reinterpolation of Oblique Edge Portion

Figure 25:
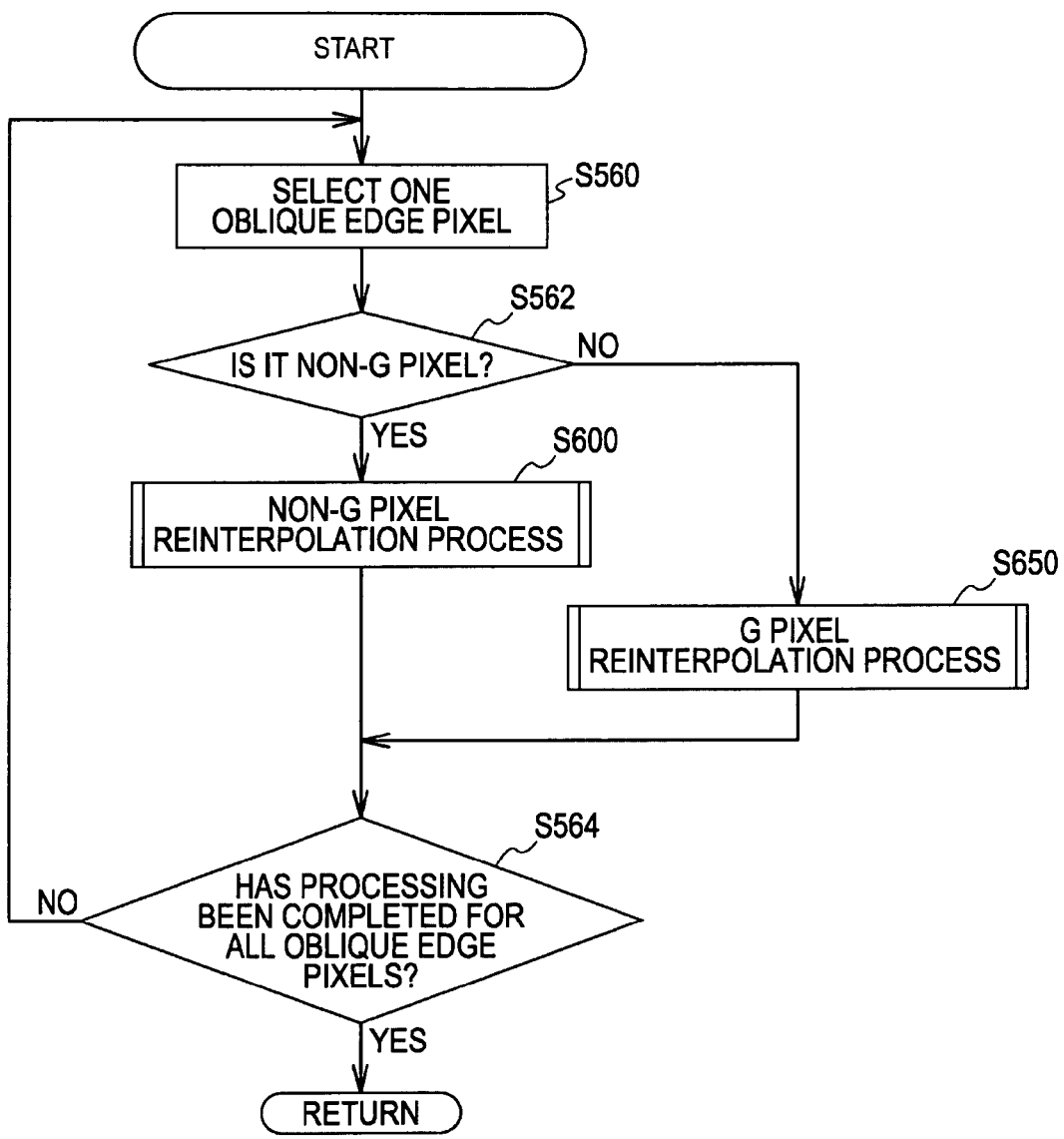
FIG. 25 is a flowchart showing the details of an oblique edge portion reinterpolation process executed in the oblique edge portion correction process of FIG. 18, in which R, G and B components are reinterpolated in each oblique edge pixel, by the image processing apparatus of the embodiment.

FIG. 25 is a flowchart showing the details of the oblique edge portion reinterpolation process in which R, G and B components are reinterpolated in the oblique edge pixels. As shown in the drawing, the process initially selects one oblique edge pixel (step S560). Then, it is determined whether the selected pixel is a non-G pixel (step S562). As described above, because the oblique edge pixel may be any one of the G pixel, the R pixel, or the B pixel, it is determined whether the selected pixel is a pixel other than the G pixel. When it is determined that the selected pixel is a non-G pixel (step S562: yes), the non-G pixel reinterpolation process that reinterpolates a missing color component in the non-G pixel along the oblique edge direction is executed (step S600). In contrast, when the selected pixel is determined to be the G pixel (step S562: no), the G pixel reinterpolation process that reinterpolates missing color components in the G pixel along the oblique edge direction is executed (step S650).

Figure 26:
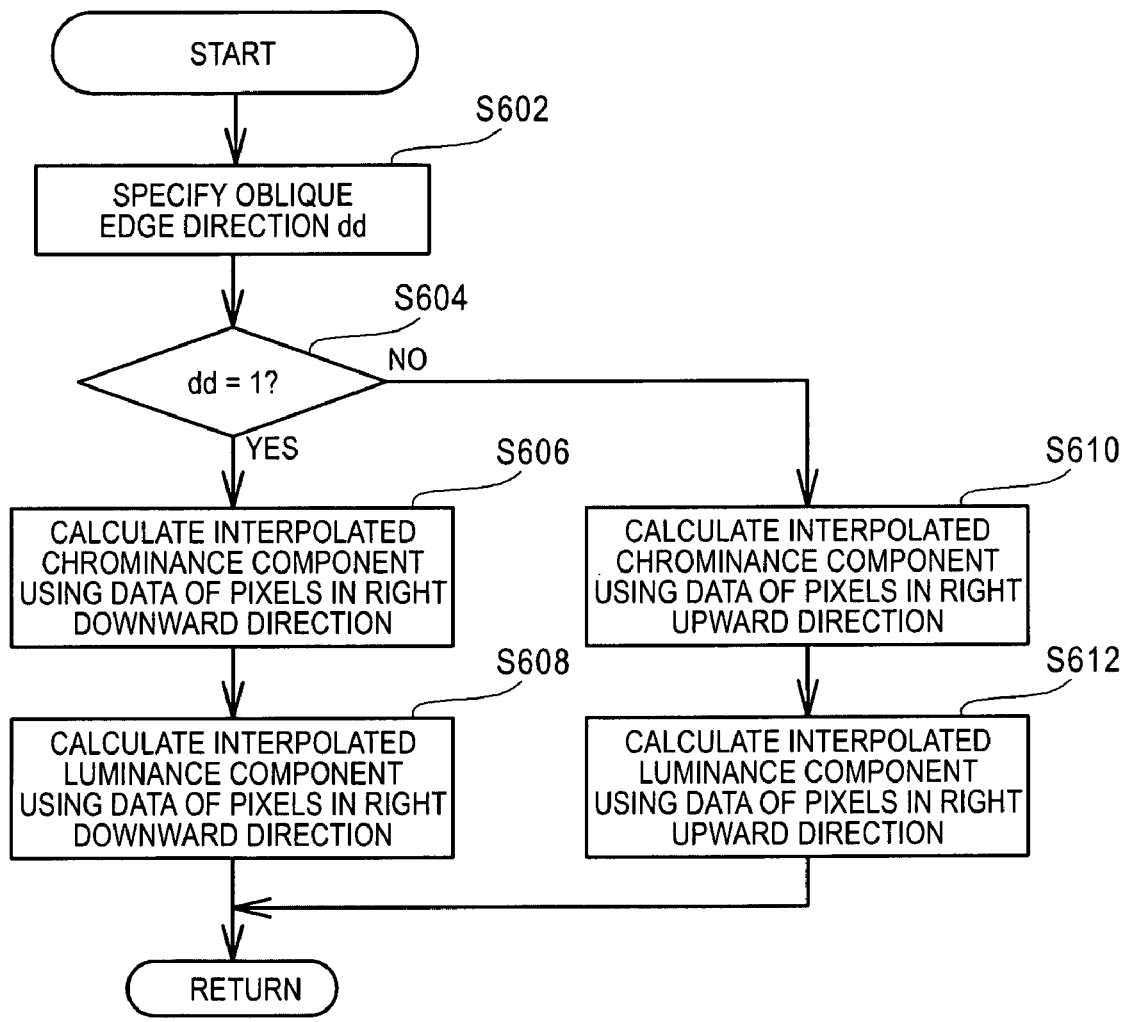
FIG. 26 is a flowchart showing the details of a non-G pixel reinterpolation process executed in the oblique edge portion reinterpolation process of FIG. 25 by the image processing apparatus of the embodiment.

FIG. 26 is a flowchart showing the details of the non-G pixel reinterpolation process. In the non-G pixel reinterpolation process, the oblique edge direction dd of the target oblique edge pixel for reinterpolation is acquired (step S602). When the acquired oblique edge direction dd is "1", that is, the edge is oriented in a right downward direction (step S604: yes), the missing non-G component is first interpolated along the right downward direction (step S606) and then the G component is interpolated along the right downward direction (step S608). For example, when the reinterpolation target oblique edge pixel is an R pixel, the B component and the G component are recalculated. Namely, the B component is interpolated first and subsequently the G component is interpolated. When the reinterpolation target oblique edge pixel is a B pixel, the R component is interpolated first and subsequently the G component is interpolated. As explained below, this specific order of interpolation operations may increase the accuracy of the non-G pixel reinterpolation process.

Figure 27A:
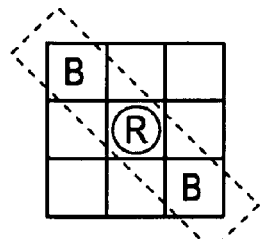
FIG. 27A and FIG. 27B show a process of reinterpolating an interpolated chrominance component and an interpolated luminance component in an R pixel along the right downward direction.
Figure 27B:
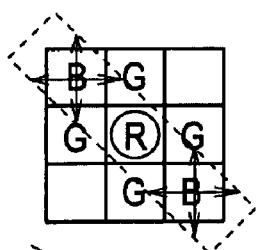

FIG. 27A and FIG. 27B show an example of the process of interpolating the two color components in an R pixel along the right downward direction. Namely, FIG. 27A shows the process of interpolating a B component (non-G component) whereas FIG. 27B shows the process of interpolating a G component in the R pixel of the raw data. Note that in the drawing the R pixel marked with a circle indicates the interpolation target pixel.

With reference to FIG. 27A, the process of reinterpolating an interpolated non-G component in a non-G pixel along the right downward direction (that is, the processing of step S606 of FIG. 26) will be described. To interpolate the missing non-G component in the non-G pixel along the right downward direction, it is only necessary to calculate the average of the raw image data (z(r−1,s−1)) of a pixel on the upper left of the interpolation target pixel and the raw image data (z(r+1, s+1)) of a pixel on the lower right of the interpolation target pixel. This may be immediately understood from FIG. 27A which shows the case in which the interpolation target pixel is an R pixel, thus implying that the non-G component to be reinterpolated is a B component. As shown in FIG. 27A, pixels that are arranged in a direction crossing the R pixel in the right downward direction, that is, the upper left pixel and the lower right pixel with respect to the R pixel, are both B pixels. Simply taking an average of the raw image data of these pixels gives an appropriate B component of the interpolation target pixel. Similarly, as can be seen in the top drawing of FIG. 4, if a non-G interpolation target pixel is a pixel of B component, then the upper left pixel and the lower right pixel are both R pixels. Simply taking an average of the raw image data of these pixels gives an appropriate R component of the interpolation target pixel. Thus, at step S606 of FIG. 26, the process of reinterpolating an interpolated non-G component in a non-G pixel along the right downward direction can be executed in the above-described manner.

With reference to FIG. 27B, the process of interpolating a G component in a non-G pixel along the right downward direction (that is, the process of step S608 of FIG. 26) will now be described. As shown in FIG. 27B, when the interpolation target pixel is an R pixel, no G pixel is present in the oblique edge direction (here, right downward direction). Thus, the method of simply taking an average by reading raw image data of pixels located in the oblique edge direction as in the case that the B component is interpolated cannot obtain a G component. However, color differences between a G component and another color component may be used for calculation. In the example shown in FIG. 27B, pixels adjacent to the interpolation target pixel in the oblique edge direction are B pixels, so that, in these pixels, the color difference components calculated by subtracting the B component from the G component have been already obtained using the process of S102. In addition, each color difference component includes two types of color difference components, that is, the vertical-direction color difference component CDv and the horizontal-direction color difference component CDh. Taking an average of these four color difference components (both CDv and CDh from the upper left pixel and both CDv and CDh from the lower right pixel) allows calculation of a value that is obtained by interpolating the color difference components in the interpolation target pixel along the oblique edge direction. For the B component, the value that is interpolated in the oblique edge direction has been already obtained. Adding the B component and the interpolated color difference component allows calculation of the G component that is interpolated in the oblique edge direction. In this way, when the interpolation target pixel is an R pixel, by taking into account the adjacent pixels in the oblique edge direction, it is possible to calculate the G component of the target interpolation pixel using both the horizontal and vertical color difference components. Similarly, as can be seen in the top drawing of FIG. 4, if a non-G interpolation target pixel is a pixel of B component, then the upper left pixel and the lower right pixel are both R pixels. Simply taking an average of the two color difference component from the upper left pixel and the two color difference components from lower right pixel gives an interpolated color difference component in the target pixel location. By adding this interpolated color difference component to the previously reinterpolated R component gives an appropriate G component of the interpolation target pixel. At step S608 of FIG. 26, the process of interpolating a G component in a non-G pixel along the right downward direction is executed in the above-described manner.

Figure 28A:
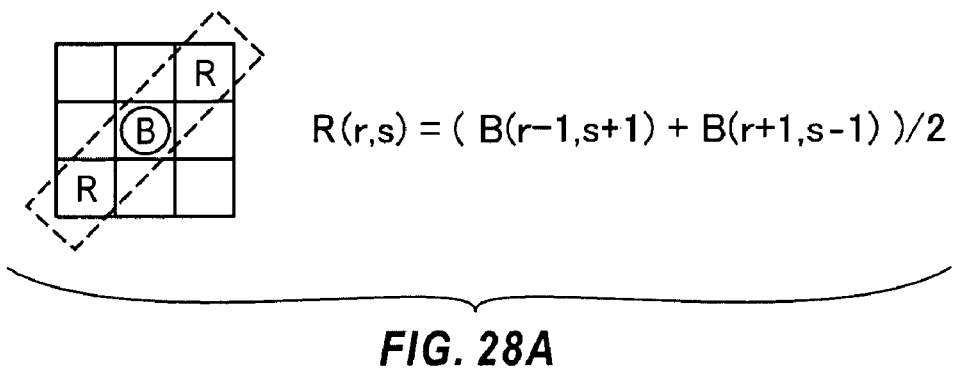
FIG. 28A and FIG. 28B show a process of reinterpolating an interpolated chrominance component and an interpolated luminance component in a B pixel along the right upward direction.
Figure 28B:
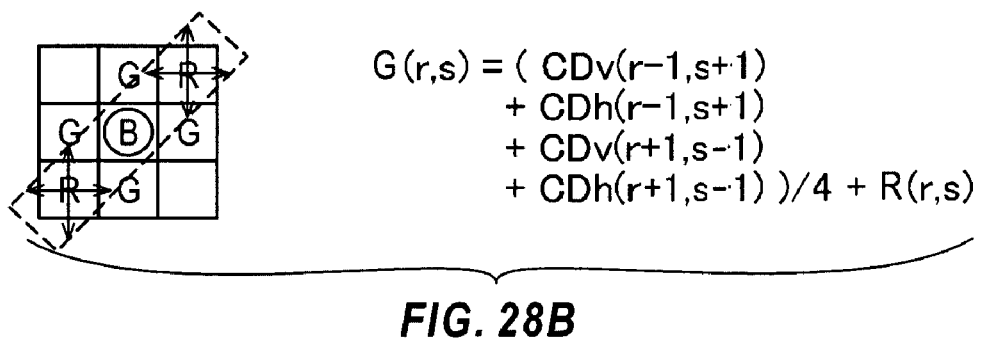

In contrast, when it is determined that the value of the oblique edge direction dd of the interpolation target pixel is "3", that is, the edge is oriented in a right upward direction (step S604: no of FIG. 26), a missing non-G component and a missing G component are interpolated along the right upward direction (step S610 and step S612). FIG. 28 shows calculation formulae for interpolation of the missing components in a non-G pixel along the right upward direction. A formula shown in FIG. 28A is a calculation formula for calculating a non-G component, and a formula shown in FIG. 28B is a calculation formula for calculating a G component. These calculation formulae differ from the formulae in FIGS. 27A and 27B in that the referenced pixels are changed to the lower left pixel and the upper right pixel and that the target pixel is a pixel of a B component. The other portions are the same, and therefore no detailed description will be given.

Note that, to further accurately reinterpolate color components in a non-G pixel, the following calculation formulae may be used in place of the calculation formulae shown in FIG. 27 and FIG. 28. Namely, FIGS. 29A to 29D show other calculation formulae for interpolation of the missing color components in a non-G pixel along the right downward direction. FIG. 29A to FIG. 29D show the process of interpolating the missing color components (B component and G component) in an R pixel along an oblique edge direction (right downward direction).

In the scenario shown in FIG. 29A, the B pixels are present in the oblique edge direction (here, the right downward direction) from the interpolation target R pixel. When the B component is interpolated along the oblique edge direction, it is possible to take an average of the raw image data of the adjacent pixels placed in the oblique edge direction, as shown previously in FIG. 27A. However, averaging two pieces of raw image data may cause a variation in a target pixel value. To avoid this problem, the B component can be calculated by taking into account raw image data of not only the adjacent pixels in the oblique edge direction but also the interpolation target pixel (pixel marked with a circle in FIGS. 29A to 29C) and the second pixels from that interpolation target pixel in the oblique edge direction. However, because the raw image data of the interpolation target pixel (pixel marked with a circle in FIG. 29A) and the second pixels from the interpolation target pixels in the oblique edge direction are not B components but R components, they may not be directly comparable to the available R components. However, by subtracting the second pixels from the interpolation target pixel these components can be used to estimate the variation in the data due to the presence of an edge. By adding such a variation to the average of R components surrounding the interpolation target pixel in an oblique edge direction can reduce the interpolation error in the target pixel. FIG. 29A shows a calculation formula for calculating the B component in the interpolation target R pixel in the above described manner. In the calculation formula shown in the drawing, when R components exhibit no variation, the R components cancel each other and only the B components are used to reinterpolate the B component in an oblique edge target pixel. However, if these R components exhibit some variations, the average value of these variations is added to the average value of the two available B components in order to match the local image characteristics. Thus, using the raw image data (that is, the R components and the B components) of the pixels that are present in the oblique edge direction from the target interpolation R pixel, it is possible to appropriately interpolate the B component in the R pixel. A similar approach is applicable to a target pixel of B component.

The method of interpolating the G component in a non-G pixel using the formulae of FIG. 29B to FIG. 29D will now be described. Two types of color difference components, that is, a color difference component obtained by subtracting an R component from a G component and a color difference component obtained by subtracting a B component from a G component, are present. The formula of FIG. 27B interpolates the G component in a non-G pixel on the basis of one type of the color difference components. That is, when the interpolation target non-G pixel is an R pixel, the G component will be interpolated on the basis of the color difference component obtained by subtracting a B component from a G component. When the interpolation target non-G pixel is a B pixel, the G component will be interpolated on the basis of the color difference component obtained by subtracting an R component from a G component. However, when the G component is interpolated on the basis of both above types of color difference components, the interpolation appears to be further appropriate. Such interpolation is possible on the basis of the color difference components of the adjacent pixels in the oblique edge direction and the color difference component of the interpolation target pixel. This point will be further described with reference to FIG. 29B to FIG. 29D.

FIG. 29B shows the process of interpolating the G component using the color difference components of the pixels adjacent to the interpolation target R pixel in the oblique edge direction (here, right downward direction). This interpolation method is similar to the method that uses the formula of FIG. 27B. The obtained G component is based on the color difference component in the form of the difference between the B component and the G component. To obtain the color difference component based on the color difference component obtained by subtracting the R component from the G component, the interpolation target pixel is taken into account. The interpolation target pixel is an R pixel, and the color difference components, that is, the vertical-direction color difference component CDv and the horizontal-direction color difference component CDh, of the pixel are color difference components obtained by subtracting the R component from the G component. By taking an average of these two color difference components and then adding the raw image data to the obtained average, it is possible to obtain the G component based on the color difference component in the form of the difference between the R component and the G component. FIG. 29C shows the process of calculating the G component in this manner.

After the G component based on the color difference between the G component and the B component and the G component based on the color difference between the G component and the B component are obtained in this manner, taking an average of these two above calculated G components gives the final G component. FIG. 29D shows the process of calculating the G component in the interpolation target R pixel in the above described manner. FIG. 29A to FIG. 29D show the case in which the B component and the G component are interpolated by assuming that the non-G pixel is an R pixel. When the non-G pixel is a B pixel, it is possible to obtain the R component and the G component in a similar manner. Both approaches are applicable to scenarios when the oblique edge is oriented right upward. FIG. 30A to FIG. 30D show an example of such a scenario for the case in which the R component and the G component are interpolated by assuming that the non-G pixel is a B pixel.

After the missing color components in the non-G pixel are obtained through interpolation along the oblique edge direction dd in the above-described manner, the CPU terminates the non-G pixel reinterpolation process shown in FIG. 26 and goes back to the oblique edge portion reinterpolation process of FIG. 25.

The non-G pixel reinterpolation process that reinterpolates the missing color components in that pixel when the oblique edge pixel is a non-G pixel, that is, it is determined "yes" at step S562 of FIG. 25 is described above. In contrast, at step S562 of FIG. 25, when it is determined that the oblique edge pixel is a G pixel (step S562: no), the G pixel reinterpolation process that reinterpolates missing R component and missing B component in the G pixel is executed in the following manner (step S650).

Figure 31:
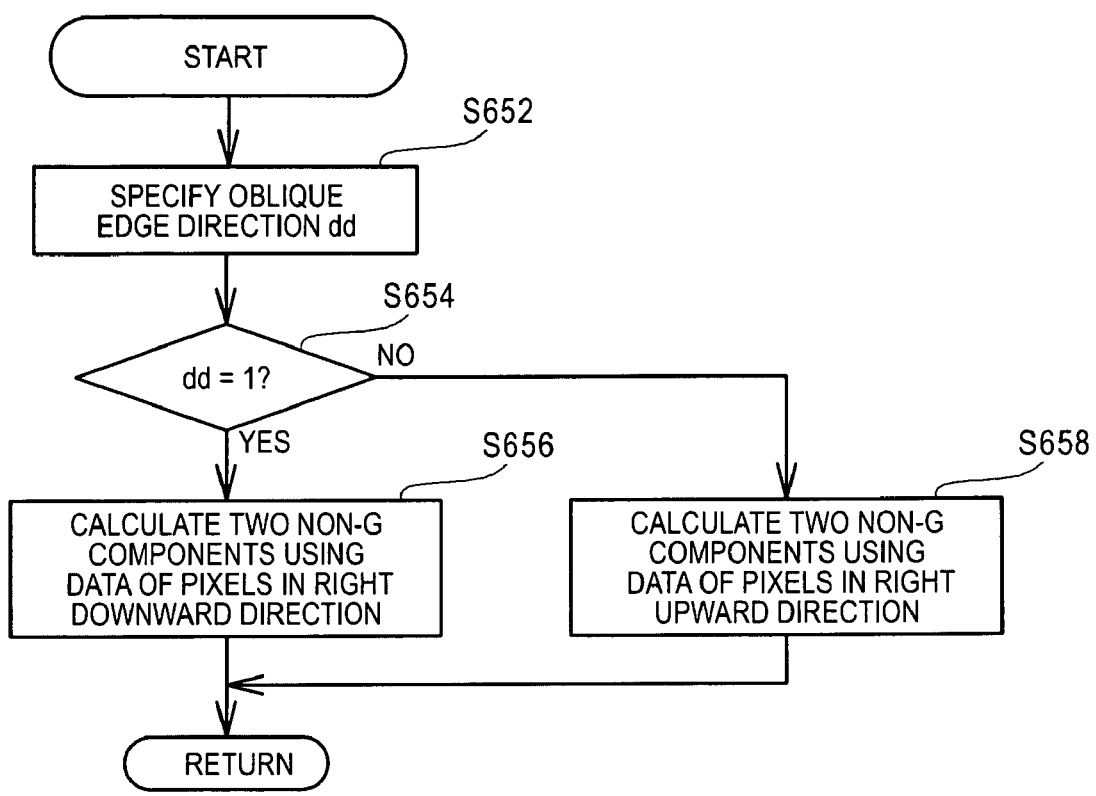
FIG. 31 is a flowchart showing the details of a G pixel reinterpolation process executed in the oblique edge portion reinterpolation process of FIG. 25 by the image processing apparatus of the embodiment.
Figure 32A:
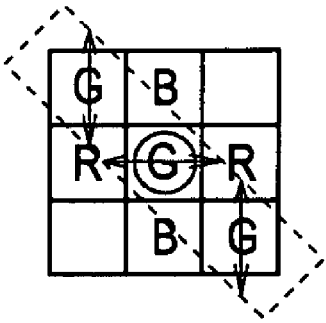
FIG. 32A and FIG. 32B show an example of recalculation of two chrominance components through interpolation in a G pixel along the right downward direction.
Figure 32B:
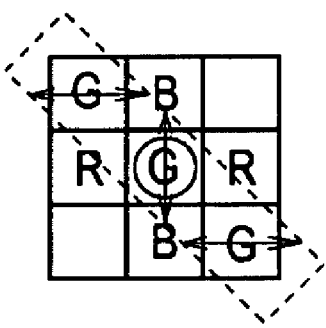

FIG. 31 is a flowchart showing the details of the G pixel reinterpolation process. In the G pixel reinterpolation process as well, as the process is started, the oblique edge direction dd of the reinterpolation target oblique edge pixel is initially acquired (step S652). Then, when the value of the acquired oblique edge direction dd is "1", that is, the edge is oriented in the right downward direction (step S654: yes), any one of the R component or the B component is calculated using the color difference components of a pixel on the upper left of the G pixel and the color difference components of a pixel on the lower right of the G pixel (step S656). The calculation formulae used in step S656 is shown in FIG. 32A and FIG. 32B. As indicated in this example, the formulas depend on whether the adjacent pixels on the left and right of the interpolation target G pixel are R pixels or B pixels, as this dictates what type of color difference components (that is, differences between the R and G components or differences between the B and G components) are used to reinterpolate the R component and the B component in a target G pixel. Details of these calculations are provided below.

FIG. 32A and FIG. 32B show an example of recalculation of the two color components through interpolation in the G pixel along the right downward direction. Note that in the drawing the G pixel marked with a circle indicates the interpolation target pixel. The manner in which one of the two color components can be calculated will now be described with reference to FIG. 32A. This color component is calculated by subtracting the value, obtained on the basis of the color difference component, from the raw image data of the interpolation target G pixel. Here, the value obtained on the basis of the color difference component is calculated by taking a weighted average with a prescribed weight of the vertical-direction color difference component $CDv(r-1,s-1)$ of the pixel on the upper left of the marked G pixel, the horizontal-direction color difference component $CDh(r,s)$ of the marked G pixel and the vertical-direction color difference component $CDv(r+1,s+1)$ of the pixel on the lower right of the marked G pixel. Then, as shown in FIG. 32A, when the marked G pixel is a pixel of which the adjacent pixels on the left and right thereof are R pixels, these color difference components both are color difference components obtained by subtracting an R component from a G component. Thus, the value obtained through the weighted average is a value of the color difference between the R component and the G component of the marked G pixel on the basis of the same type color difference components of the pixels that are present in the oblique edge direction (here, the right downward direction) with the marked G pixel being placed in the middle. In addition, because the raw image data of the marked G pixel is a G component, the R component of the marked G pixel may be obtained by subtracting the obtained this weighted average color difference component from the raw image data.

FIG. 32A exemplifies the case in which the adjacent pixels on the left and right of the G pixel are R pixels. However, this also applies to the case in which the left and right adjacent pixels are B pixels, and the B component of the G pixel may be obtained. Thus, by using the concept depicted in FIG. 32A, for the G pixel of which the left and right adjacent pixels are R pixels, the R component of that G pixel will be obtained whereas for the G pixel of which the left and right adjacent pixels are B pixels, the B component of that G pixel will be obtained.

The manner in which the second color component can be recalculated will now be described with reference to FIG. 32B. As shown in the formula of FIG. 32B, this color component is also calculated, as in the case of FIG. 32A, by subtracting the value, obtained on the basis of the color difference component, from the raw image data of the interpolation target G pixel. Although the pixel locations of which the color difference components are referenced are the same, the directions of the referenced color difference components are different. That is, as shown in FIG. 32B, the value of the second color component is obtained by taking a weighted average with a prescribed weight of the horizontal-direction color difference component $CDh(r-1,s-1)$ of the pixel on the upper left of the marked G pixel, the vertical-direction color difference component $CDv(r,s)$ of the marked G pixel and the horizontal-direction color difference component $CDh(r+1,s+1)$ of the pixel on the lower right of the marked G pixel. These color difference components all are color difference components obtained by subtracting a B component from a G component. By subtracting this weighted average value from the raw image data, it is possible to calculate the B component of the marked G pixel. Of course, by executing a similar process on a G pixel of which the left and right pixels are B pixels, it is possible to obtain the R component of that G pixel. Thus, by using the concept of FIG. 32B, for the G pixel of which the left and right adjacent pixels are R pixels, the B component of that G pixel will be obtained whereas for the G pixel of which the left and right adjacent pixels are B pixels, the R component of that G pixel will be obtained.

For the above reasons, when it is determined that the oblique edge direction dd is "1", that is, the right downward direction (step S654: yes of FIG. 31), using the formulae of FIGS. 32A and 32B gives the two non-G components (that is, the R component and the B component) in the target G pixel with an oblique edge orientation.

Figure 33A:
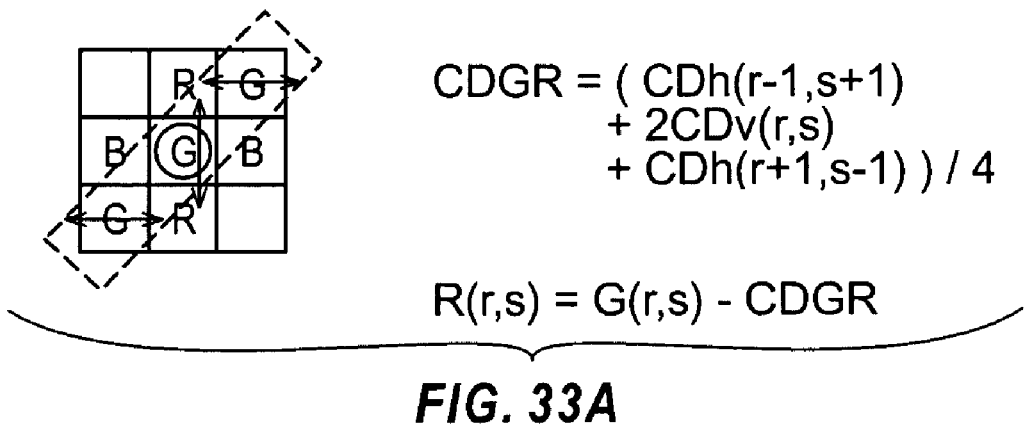
FIG. 33A and FIG. 33B show an example recalculation of two chrominance components through interpolation in a G pixel along the right upward direction.
Figure 33B:
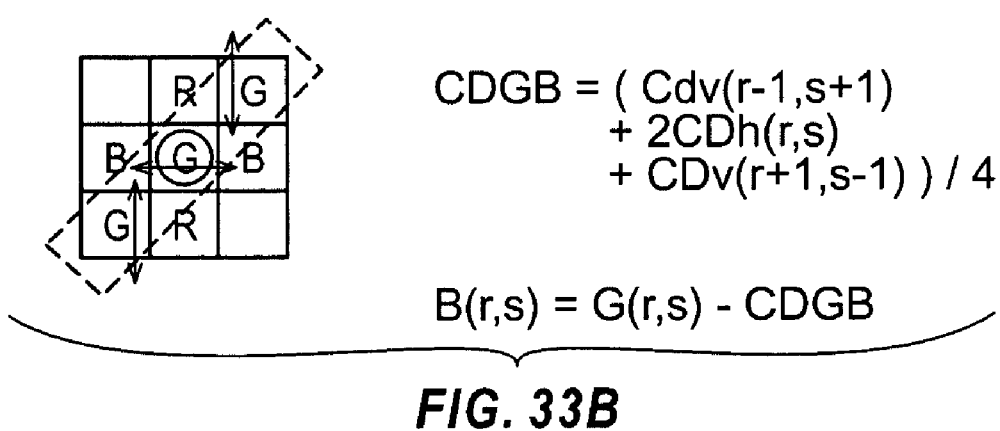

In contrast, when it is determined that the oblique edge direction dd is not "1", that is, the right upward direction (step S654: no of FIG. 31), the two interpolated color components are recalculated using the formulae of FIG. 33. The formulae of FIG. 33 differ from the above described formulae of FIG. 32 in that, in correspondence with the difference of the oblique edge direction, the pixel locations of which the color difference components are referenced are different. Thus, similar to the manner in which the two color components are obtained for an oblique edge of a right downward direction (FIGS. 32A and 32B), the two color components are obtained also for an oblique edge of a right upward direction (FIG. 33). FIG. 33A and FIG. 33B exemplify the case in which the adjacent pixels on the left and right of the G pixel are B pixels. However, this also applies to the case in which the left and right adjacent pixels are R pixels. Thus, by using the concept depicted in FIG. 33A, for the G pixel of which the left and right adjacent pixels are R pixels, the R component of that G pixel will be obtained whereas for the G pixel of which the left and right adjacent pixels are B pixels, the B component of that G pixel will be obtained. Similarly, by using the concept depicted in FIG. 33B, for the G pixel of which the upper and lower adjacent pixels are R pixels, the R component of that G pixel will be obtained whereas for the G pixel of which the upper and lower adjacent pixels are B pixels, the B component of that G pixel will be obtained.

Through the above described processes, the R component and the B component are obtained through interpolation along the oblique edge direction in the G pixel in which the edge is oriented obliquely. The CPU then terminates the G pixel reinterpolation process shown in FIG. 31 and goes back to the oblique edge portion reinterpolation process shown in FIG. 25.

In this manner, in the oblique edge portion reinterpolation process shown in FIG. 25, as an oblique edge pixel is selected (step S560), when the pixel is a non-G pixel (step S562: yes), the above described non-G pixel reinterpolation process is executed (step S600), whereas, when the oblique edge pixel is a G pixel (step S562: no), the above described G pixel reinterpolation process is executed (step S650) to reinterpolate the missing color components in the raw image data of the oblique edge pixel along the oblique edge direction. Every time one oblique edge pixel is reinterpolated, it is determined whether reinterpolation is complete for all the oblique edge pixels (step S564). When there is any oblique edge pixel that is not reinterpolated (step S564: no), the process goes back to the first step to select another oblique edge pixel (step S560) and executes the above-described series of operations. During repeating the above-described operations, when it is determined that reinterpolation is complete for all the oblique edge pixels (step S564: yes), the CPU terminates the oblique edge portion reinterpolation process of FIG. 25 and goes back to the oblique edge portion correction process of FIG. 18. Then, the process returns from the oblique edge portion correction process to the color image data generation process of FIG. 3. Further appropriate color image data is thus obtained by executing reinterpolation in the pixel in which the edge is oriented in the oblique direction along the edge direction. Then, the obtained color image data is output (step S114) to terminate the color image data generation process of FIG. 3.

In the color image data generation process of the embodiment as described above, it is possible to obtain appropriate R, G, and B components, which are interpolated along the edge direction, at the portions at which the edge is oriented obliquely. In addition, because the process of reinterpolating the interpolated color components in the demosaiced image data may be executed only on the pixels in which the edge is oriented obliquely, the actual processing time to generate color image data from raw image data does not significantly increase.

The digital camera 100 of the embodiment generates the color image data from the raw image data according to the procedure described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An image processing apparatus that receives mosaic image data having settings of only one color component, R, G, or B, in each pixel and subjects the received mosaic image data to a series of image processing to generate color image data with settings of all the three color components, R, G, and B, in each pixel, wherein the mosaic image data has the form of a Bayer color filter array, the image processing apparatus comprising:

a vertical-direction color difference component computation module configured to obtain the G component in the pixel location of another color component or to obtain another color component in the G component pixel location using vertically neighboring available components in order to compute a vertical-direction color difference component between the G component and the other color component in each pixel included in each of the pixel columns of the mosaic image;

a horizontal-direction color difference component computation module configured to obtain the G component in the pixel location of another color component or to obtain another color component in the G component pixel location using horizontally neighboring color components in order to compute a horizontal-direction color difference component between the G component and the another color component in each pixel included in each of the pixel rows of the mosaic image;

an edge direction determination module configured to determine an edge direction, vertical or horizontal, by selecting a pixel of the R component and a pixel of the B component from among the mosaic image data, and comparing a variation of the vertical color difference component and a variation of the horizontal color difference component in each selected pixel;

a color component interpolation module configured to interpolate a missing color component, which is a color component not set in the pixel for each pixel of the mosaic image data, on the basis of the color component set in the mosaic image data while referencing the edge direction;

an oblique edge pixel detection module configured to detect an oblique edge pixel, of which the edge direction is oriented obliquely, by analyzing the full-color image data in which the color components, absent in the original raw image data, are interpolated;

an oblique edge direction determination module configured to determine an oblique edge direction, which is the edge direction in the oblique edge pixel, on the basis of the vertical-direction color difference component and the horizontal-direction color difference component; and an oblique edge pixel interpolation correction module configured to recalculate the two interpolated color components in the oblique edge pixel on the basis of at least one of the mosaic image data, the vertical-direction color difference component and the horizontal-direction color difference component in a pixel placed in the oblique edge direction from the oblique edge pixel and then update the color component under consideration obtained by the color component interpolation module with the calculated color component to thereby correct the interpolated result in the oblique edge pixel.

2. The image processing apparatus according to claim 1, further comprising a color difference component computation module configured to calculate a color difference component expressed as the difference between an R component and a B component for each pixel on the basis of the image data in which the missing color components are interpolated, and wherein the oblique edge pixel detection module is configured to detect a pixel in which both a variation of such a color difference component in the vertical direction and a variation of such a color difference component in the horizontal direction are larger than a predetermined value as the oblique edge pixel.

3. The image processing apparatus according to claim 1, wherein:
the oblique edge direction determination module includes:
a summation color difference component computation module configured to calculate a summation color difference component, that represents the summation of the vertical-direction color difference component and the horizontal-direction color difference component for each oblique edge pixel; and a summation color difference component variation computation module configured to calculate a variation of the summation color difference component in a right upward direction across the oblique edge pixel placed in the middle and a variation of the summation color difference component in a right downward direction across the oblique edge pixel placed in the middle for each oblique edge pixel, wherein
the oblique edge direction determination module compares the variation in the right upward direction and the variation in the right downward direction for each oblique edge pixel to determine the direction of which the variation is small as the oblique edge direction of the oblique edge pixel.

4. The image processing apparatus according to claim 1, further comprising:
a detection oblique edge noise removal module configured to detect detection noise that is an erroneously determined oblique edge or erroneously non-determined oblique edge by comparing said determined or non-determined oblique edge with the edge directions of surrounding pixels, and removing the detection noise.

5. The image processing apparatus according to claim 1, further comprising:
a direction oblique edge noise removal module configured to detect edge noise that is an erroneously determined edge direction by comparing said edge direction with the edge directions of surrounding pixels, and removing the edge noise.

6. The image processing apparatus according to claim 1, wherein:
the oblique edge pixel interpolation correction module includes a non-G pixel oblique edge pixel reinterpolation module and a G pixel oblique edge pixel reinterpolation module, wherein:
the non-G pixel oblique edge pixel reinterpolation module is configured to reinterpolate non-G components and G components, both originally absent in raw mosaic data, along a right downward direction or along a right upward direction, wherein in each oblique edge pixel location a non-G component is obtained using non-G components present in the raw mosaic data along the oblique edge direction, and wherein a G component is obtained using either:
the recalculated non-G component and color difference components of a pixel on the upper left and the lower right of the G pixel or using the color difference components of a pixel on the upper left and the lower right or a pixel on the lower left and the upper right of the interpolation target pixel; or
both non-G components of the interpolation target pixel, color difference components of the interpolation target pixel and the color difference components of a pixel on the color difference components of a pixel on the upper left and the lower right or a pixel on the lower left and the upper right of the interpolation target pixel; and
the G pixel oblique edge pixel reinterpolation module is configured to reinterpolate two non-G components, originally absent in raw mosaic data, along a right downward direction or along a right upward direction using the color difference components of an interpolation target pixel and the color difference components of a pixel on the upper left and the lower right of the G pixel or using the color difference components of an interpolation target pixel and the color difference components of a pixel on the lower left and the upper right of the G pixel.

7. An image processing method that receives mosaic image data having settings of only one color component, R, G, or B, in each pixel and subjects the received mosaic image data to a series of image processing to generate color image data with settings of all the three color components R, G, and B in each pixel, the image processing method comprising:
receiving, as the mosaic image data, image data in the form of a Bayer color filter array;
obtaining the G component and the another color component in each pixel included in each of the pixel columns of the mosaic image data, and computing a vertical-direction color difference component between the G component and the another color component in each pixel included in each of the pixel columns in the vertical direction;
obtaining the G component and the another color component in each pixel included in each of the pixel rows of the mosaic image data, and computing a horizontal-direction color difference component between the G component and the another color component in each pixel included in each of the pixel rows in the horizontal direction;
determining an edge direction in each pixel as any one of the vertical direction or the horizontal direction by selecting, from among the mosaic image data, a pixel of the R component or a pixel of the B component, and comparing a variation of the vertical-direction color difference component and a variation of the horizontal-direction color difference component of the selected pixel;
interpolating a missing color component, which is a color component not set in the pixel for each pixel of the mosaic image data, on the basis of the color component set in the mosaic image data while referencing the edge direction;
detecting an oblique edge pixel, of which the edge direction is oriented obliquely, by analyzing the image data in which the missing color component is interpolated;
determining an oblique edge direction, which is the edge direction in the oblique edge pixel, on the basis of the vertical-direction color difference component and the horizontal-direction color difference component; and
recalculating the interpolated color component in the oblique edge pixel on the basis of at least one of the mosaic image data, the vertical-direction color difference component and the horizontal-direction color difference component in a pixel placed in the oblique edge direction from the oblique edge pixel and then updating the interpolated color component with its recalculated variant to thereby correct the interpolated result in the oblique edge pixel.

8. The image processing method according to claim 7, wherein determining an oblique edge direction further comprises:
calculating a summation color difference component, that represents the summation of the vertical-direction color difference component and the horizontal-direction color difference component for each oblique edge pixel; and
calculating a variation of the summation color difference component in a right upward direction across the oblique edge pixel placed in the middle and a variation of the summation color difference component in a right downward direction across the oblique edge pixel placed in the middle for each oblique edge pixel,
wherein the variation in the right upward direction and the variation in the right downward direction is compared for each oblique edge pixel to determine the direction of which the variation is small as the oblique edge direction of the oblique edge pixel.

9. The image processing method according to claim 7, further comprising detecting detection noise that is an erroneously determined oblique edge or erroneously non-determined oblique edge by comparing said determined or non-determined oblique edge with the edge directions of surrounding pixels, and removing the detection noise.

10. The image processing method according to claim 7, further comprising detecting edge noise that is an erroneously determined edge direction by comparing said erroneously determined edge direction with the edge directions of surrounding pixels, and removing the edge noise.

11. The image processing method according to claim 7, wherein recalculating the interpolated color component in the oblique edge pixel further comprises:
reinterpolating a non-G component and a G component, both originally absent in raw mosaic data, in non G oblique edge pixel along a right downward direction or along a right upward direction, wherein in each oblique edge pixel location a non-G component is obtained using non-G components present in the raw mosaic data along the oblique edge direction, and wherein a G component is obtained using either:
the recalculated non-G component and color difference components of a pixel on the upper left and the lower right of the G pixel or using the color difference components of a pixel on the upper left and the lower right or a pixel on the lower left and the upper right of the interpolation target pixel; or
both non-G components of the interpolation target pixel, color difference components of the interpolation target pixel and the color difference components of a pixel on the color difference components of a pixel on the upper left and the lower right or a pixel on the lower left and the upper right of the interpolation target pixel; and
reinterpolating two non-G components, originally absent in raw mosaic data, in an oblique edge G pixel along a right downward direction or along a right upward direction using using the color difference components of an interpolation target pixel and the color difference components of a pixel on the upper left and the lower right of the G pixel or using the color difference components of an interpolation target pixel and the color difference components of a pixel on the lower left and the upper right of the G pixel.

12. One or more non-transitory computer-readable media having computer-readable instructions thereon which, when executed, implement a method for receiving mosaic image data having settings of only one color component, R, G, or B, in each pixel and subjecting the received mosaic image data to a series of image processing to generate color image data with settings of all the three color components, R, G, and B, in each pixel, the method comprising:
receiving, as the mosaic image data, image data in the form of a Bayer color filter array;
obtaining the G component and the another color component in each pixel included in each of the pixel columns of the mosaic image data, and computing a vertical-direction color difference component between the G component and the another color component in each pixel included in each of the pixel columns in the vertical direction;
obtaining the G component and the another color component in each pixel included in each of the pixel rows of the mosaic image data, and computing a horizontal-direction color difference component between the G component and the another color component in each pixel included in each of the pixel rows in the horizontal direction;
determining an edge direction in each pixel as any one of the vertical direction or the horizontal direction by selecting, from among the mosaic image data, a pixel of the R component or a pixel of the B component, and comparing a variation of the vertical-direction color difference component and a variation of the horizontal-direction color difference component of the selected pixel;
interpolating a missing color component, which is a color component not set in the pixel for each pixel of the mosaic image data, on the basis of the color component set in the mosaic image data while referencing the edge direction;
detecting an oblique edge pixel, of which the edge direction is oriented obliquely, by analyzing the image data in which the missing color component is interpolated;
determining an oblique edge direction, which is the edge direction in the oblique edge pixel, on the basis of the vertical-direction color difference component and the horizontal-direction color difference component; and
recalculating the interpolated color component in the oblique edge pixel on the basis of at least one of the mosaic image data, the vertical-direction color difference component and the horizontal-direction color difference component in a pixel placed in the oblique edge direction from the oblique edge pixel and then updating the interpolated color component by the calculated missing color component to thereby correct the interpolated result in the oblique edge pixel.

13. The one or more non-transitory computer-readable media according to claim 12, wherein determining an oblique edge direction further comprises:
calculating a summation color difference component, that represents the summation of the vertical-direction color difference component and the horizontal-direction color difference component for each oblique edge pixel; and
calculating a variation of the summation color difference component in a right upward direction across the oblique edge pixel placed in the middle and a variation of the summation color difference component in a right downward direction across the oblique edge pixel placed in the middle for each oblique edge pixel, wherein the variation in the right upward direction and the variation in the right downward direction is compared for each oblique edge pixel to determine the direction of which the variation is small as the oblique edge direction of the oblique edge pixel.

14. The one or more non-transitory computer-readable media according to claim 12, further comprising detecting detection noise that is an erroneously determined oblique edge or erroneously non-determined oblique edge by comparing said determined or non-determined oblique edge with the edge directions of surrounding pixels, and removing the detection noise.

15. The one or more non-transitory computer-readable media according to claim 12, further comprising detecting edge noise that is an erroneously determined edge direction by comparing said erroneously determined edge direction with the edge directions of surrounding pixels, and removing the edge noise.

16. The one or more non-transitory computer-readable media according to claim 12, wherein recalculating the interpolated color component in the oblique edge pixel further comprises:
   reinterpolating a non-G component and a G component, both originally absent in raw mosaic data, in non G oblique edge pixel along a right downward direction or along a right upward direction, wherein in each oblique edge pixel location a non-G component is obtained using non-G components present in the raw mosaic data along the oblique edge direction, and wherein a G component is obtained using either:
      the recalculated non-G component and color difference components of a pixel on the upper left and the lower right of the G pixel or using the color difference components of a pixel on the upper left and the lower right or a pixel on the lower left and the upper right of the interpolation target pixel; or
      both non-G components of the interpolation target pixel, color difference components of the interpolation target pixel and the color difference components of a pixel on the color difference components of a pixel on the upper left and the lower right or a pixel on the lower left and the upper right of the interpolation target pixel; and
reinterpolating two non-G components, originally absent in raw mosaic data, in an oblique edge G pixel along a right downward direction or along a right upward direction using the color difference components of an interpolation target pixel and the color difference components of a pixel on the upper left and the lower right of the G pixel or using the color difference components of an interpolation target pixel and the color difference components of a pixel on the lower left and the upper right of the G pixel.

* * * * *